United States Patent
Koudouridis et al.

(10) Patent No.: US 10,285,182 B2
(45) Date of Patent: May 7, 2019

(54) METHODS AND NETWORK NODES IN A WIRELESS COMMUNICATION NETWORK

(71) Applicant: Huawei Technologies Co., Ltd., Shenzhen (CN)

(72) Inventors: George Koudouridis, Kista (SE); Henrik Lundqvist, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 15/469,158

(22) Filed: Mar. 24, 2017

(65) Prior Publication Data
US 2017/0238299 A1 Aug. 17, 2017

Related U.S. Application Data

(63) Continuation of application No. PCT/EP2014/070677, filed on Sep. 26, 2014.

(51) Int. Cl.
*H04W 72/04* (2009.01)
*H04W 72/08* (2009.01)
(Continued)

(52) U.S. Cl.
CPC ......... *H04W 72/048* (2013.01); *H04W 8/22* (2013.01); *H04W 24/10* (2013.01);
(Continued)

(58) Field of Classification Search
CPC ..... H04W 24/10; H04W 52/02; H04W 72/08; H04W 72/12; H04W 8/22
See application file for complete search history.

(56) References Cited

U.S. PATENT DOCUMENTS

2004/0240428 A1* 12/2004 Jiang ............... H04L 45/00
370/351
2006/0270414 A1* 11/2006 Veerasamy ........... H04W 28/24
455/452.1
(Continued)

FOREIGN PATENT DOCUMENTS

CN 103609184 A 2/2014
WO WO 2009034089 A1 3/2009

OTHER PUBLICATIONS

Bhushan et al., "Network Densification: The Dominant Theme for Wireless Evolution into 5G," IEEE Communications Magazine, pp. 82-89, Institute of Electrical and Electronics Engineers, New York, New York (Feb. 2014).

(Continued)

*Primary Examiner* — Anez C Ebrahim
(74) *Attorney, Agent, or Firm* — Leydig, Voit & Mayer, Ltd.

(57) ABSTRACT

A network node (110, 120, 130) and a method therein for radio access resource allocation of a mobile station (140) is disclosed. The network node (110, 120, 130) comprises a receiver (630), configured to receive at least one first parameter value associated with a radio communication condition of the mobile station (140), at least one second parameter value associated with communication capabilities of the mobile station (140), and at least one third parameter value indicating operability in MRTD of the mobile station (140). Further the network node (110, 120, 130) comprises a processor (620), configured to allocate at least one radio access resource to the mobile station (140), based on the received parameter values. In addition, the network node (110, 120, 130) comprises a transmitter (610), configured to inform the mobile station (140) of the at least one allocated radio access resource.

15 Claims, 6 Drawing Sheets

(51) Int. Cl.
H04W 72/12 (2009.01)
H04W 8/22 (2009.01)
H04W 24/10 (2009.01)
H04W 52/02 (2009.01)
H04W 88/06 (2009.01)

(52) U.S. Cl.
CPC ..... *H04W 52/0216* (2013.01); *H04W 72/082* (2013.01); *H04W 72/085* (2013.01); *H04W 72/121* (2013.01); *H04W 72/1215* (2013.01); *H04W 88/06* (2013.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/146* (2018.01)

(56) References Cited

U.S. PATENT DOCUMENTS

| | | | | |
|---|---|---|---|---|
| 2007/0232318 | A1* | 10/2007 | Nobukiyo | H04W 52/16 455/450 |
| 2009/0316591 | A1* | 12/2009 | Reial | H04L 1/0023 370/252 |
| 2012/0064908 | A1 | 3/2012 | Fox et al. | |
| 2014/0213275 | A1 | 7/2014 | Chou et al. | |
| 2015/0094054 | A1* | 4/2015 | Osman | H04M 1/72516 455/421 |

OTHER PUBLICATIONS

Gelabert et al., "Small Cell Densification Requirements in High Capacity Future Cellular Networks," IEEE International Conference on Communications 2013, pp. 1112-1116, Institute of Electrical and Electronics Engineers, New York, New York (2013).

"3$^{rd}$ Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 v9.0.0, 3$^{rd}$ Generation Partnership Project, Valbonne, France, (Mar. 2010).

"3$^{rd}$ Generation Partnership Project; Technical Specification Group Radio Access Network; Study on Small Cell enhancements for E-UTRA and E-UTRAN; Higher layer aspects (Release 12)," 3GPP TR 36.842 v12.0.0, 3$^{rd}$ Generation Partnership Project, Valbonne, France, (Dec. 2013).

Hildebrand et al., "Performance Investigation of Multi Standard Radio Resource Management for Packet Switched Services," IEEE Vehicular Technology Conference, pp. 3466-3470, Institute of Electrical and Electronics Engineers, New York, New York (2004).

Koudouridis et al., "Feasibility Studies and Architecture for Multi-Radio Access in Ambient Networks," pp. 1-12, Wireless World, Research Forum, (Dec. 2005).

Furuskar et al., "Multiservice Allocation for Multiaccess Wireless Systems," IEEE Transactions on Wireless Communications, vol. 4, No. 1, pp. 174-184, Institute of Electrical and Electronics Engineers, New York, New York (Jan. 2005).

Magnusson et al., "Multi-Radio Resource Management for Communication Networks beyond 3G," IEEE, pp. 1653-1657, Institute of Electrical and Electronics Engineers, (2005).

Veronesi, "Multiuser Scheduling with Multi Radio Access Selection," IEEE, pp. 455-459, Institute of Electrical and Electronics Engineers, Ferrara, Italy, (2005).

Karimi et al., "On the Spectral Efficiency Gains of Switched Multi-Radio Transmission Diversity," WPMC, Aalborg, Denmark, (Sep. 18-22, 2005).

Berggren et al., "Performance Analysis of Access Selection and Transmit Diversity in Multi-Access Networks," MobiCom' 06, pp. 251-261, ACM, Los Angeles, California, (Sep. 23-26, 2006).

Koudouridis et al., "Generic Link Layer Functionality for Multi-Radio Access Networks." (Jun. 2005).

Bastos et al., "Smart interface switching for energy efficient vertical handovers in ns-2," IET Communications, vol. 6, Iss. 14, pp. 2228-2238, The Institution of Engineering and Technology (2012).

Huq et al., "Investigation on Energy Efficiency in HetNet CoMP Architecture," IEEE Communications QoS, Reliability and Modeling Symposium, Institute of Electrical and Electronics Engineers, (2014).

Huang et al., "A Close Examination of Performance and Power Characteristics of 4G LTE Networks," MobiSys' 12, ACM, (Jun. 25-29, 2012).

Lampropoulos et al., " A Power Consumption Analysis of Tight-Coupled WLAN/UMTS Networks," The 18$^{th}$ Annual IEEE International Symposium on Personal,Indoor, and Mobile Radio Communications, Institute of Electrical and Electronics Engineers, (2007).

Castillo et al., "Energy Consumption Impact from Wi-Fi Traffic Offload," The Tenth International Symposium on Wireless Communication Systems, pp. 91-95, Offenbach. Germany, (2013).

* cited by examiner

METHODS AND NETWORK NODES IN A WIRELESS COMMUNICATION NETWORK

CROSS-REFERENCE TO RELATED APPLICATIONS

This application is a continuation of International Application No. PCT/EP2014/070677, filed on Sep. 26, 2014, the disclosure of which is hereby incorporated by reference in its entirety.

TECHNICAL FIELD

Implementations described herein generally relate to a network node and a method in a network node. In particular, a mechanism is herein described, for radio access resource allocation of a mobile station.

BACKGROUND

A mobile station, also known as a User Equipment (UE), wireless terminal and/or mobile terminal is enabled to communicate wirelessly in a wireless communication network, sometimes also referred to as a cellular radio system. The communication may be made, e.g., between user equipment, between a user equipment and a wire connected telephone and/or between a user equipment and a server via a Radio Access Network (RAN) and possibly one or more core networks. The wireless communication may comprise various communication services such as voice, messaging, packet data, video, broadcast, etc.

The mobile station may further be referred to as mobile telephone, cellular telephone, computer tablet or laptop with wireless capability, etc. The mobile station in the present context may be, for example, portable, pocket-storable, hand-held, computer-comprised, or vehicle-mounted mobile devices, enabled to communicate voice and/or data, via the radio access network, with another entity, such as another mobile station, a stationary entity or a server.

The wireless communication network covers a geographical area which is divided into cell areas, with each cell area being served by a network node, radio network node or base station, e.g., a Radio Base Station (RBS) or Base Transceiver Station (BTS), which in some networks may be referred to as "eNB", "eNodeB", "NodeB" or "B node", depending on the technology and/or terminology used.

Sometimes, the expression "cell" may be used for denoting the network node itself. However, the cell may also in normal terminology be used for the geographical area where radio coverage is provided by the network node at a base station site. One network node, situated on the base station site, may serve one or several cells. The network nodes may communicate over the air interface operating on radio frequencies with any mobile station within range of the respective network node.

In some radio access networks, several network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Spécial Mobile).

In 3rd Generation Partnership Project (3GPP) Long Term Evolution (LTE), network nodes, which may be referred to as eNodeBs or eNBs, may be connected to a gateway, e.g., a radio access gateway, to one or more core networks. LTE is based on the GSM/EDGE and UMTS/HSPA network technologies, increasing the capacity and speed using a different radio interface together with core network improvements.

LTE-Advanced, i.e. LTE Release10 and later releases are set to provide higher bitrates in a cost efficient way and, at the same time, completely fulfil the requirements set by International Telecommunication Union (ITU) for the International Mobile Telecommunications (IMT)-Advanced, also referred to as 4G.

In the present context, the expressions downlink, downstream link or forward link may be used for the transmission path from the network node to the mobile station. The expression uplink, upstream link or reverse link may be used for the transmission path in the opposite direction, i.e., from the mobile station to the network node.

The increasing energy consumption of radio access networks has become more of an economic and environmental concern to the network operators. At the same time an ever increasing traffic demand requires more radio access resources to be utilised. Improving system and user throughput, while keeping the energy cost low, implies that future radio access networks should assure both spectral- and energy-efficiency. To this end, one solution approach that gains momentum for future networks is densification. However studies have showed that a plain network densification would significantly increase the overall energy costs.

Within 3GPP standards organisation densification refers to the deployment of large number of low power nodes (i.e., with small coverage area), which would provide an increasing number of radio resources closer to the mobile station. The availability of a large number of Radio Access (RA) resources belonging to one Radio Access Technology (RAT) induces interference which is associated with higher energy cost and requires spectrum sharing and interference coordination mechanisms. For operators that own legacy radio networks of multiple RATs, densification of radio accesses may be achieved by means of an integration of different RATs and Multi-Radio Access (MRA) selection mechanisms. This is easily accomplished as most mobile stations today support multiple frequency bands and radio access technologies. In addition, such a MRA densification would also provide non-interfering radio accesses, since different RATs operate at different frequencies. Therefore, there is currently a strong interest from operators and standardisation bodies in the integration of different radio access technologies to meet the increasing demand for wireless data traffic.

In a denser network it is beneficial to include both cellular and wireless LAN access technologies in base stations, and the mobile stations are likely to have interfaces for multiple RATs and base stations to connect over. So far, the integration of different cellular radio access networks are relatively tightly integrated, while integration between cellular and e.g. WLAN is implemented at high layers of the protocol stack, and not integrated in the access networks. However, the trend is that the integration is moving closer to the access networks, and for future networks an integration of the scheduling of multiple accesses is considered.

Multi-radio schemes have been investigated for various heterogeneous access networks consisting of various RAT combinations. The term heterogeneous networks, or HetNets, has been predominantly used for the single RAN case to denote a network environment that consists of a set of nodes that operate on the same spectrum with coverage overlap and different transmit power.

The term heterogeneous access networks refer to multi-radio networks that can co-operate to provide in a transparent way services to the mobile stations. In many cases this cooperation is realised in a form of efficient vertical handovers between the constituent RATs.

Split data flows between two communicating entities over more than one RAs has been performed to improve capacity. The problem is that as the data volumes increase more data needs to go through the receiver basebands of the small battery-driven mobile station devices. Targeting a 100× or 1000× times increase of the amount of traffic without doing anything about how many Joules per bit are spent, the battery of the mobile station will run out in just some few minutes. The energy consumption of different schemes for selection of the most suitable interfaces from an energy perspective during handover or coordinated transmission is thus an important topic. The energy consumed to transmit data to/from the mobile station depends on many factors pertinent to the implementation of the RAs and their radio interfaces. These factors comprises the data transmission and control overhead, the efficiency of multiple access and multiplexing scheme, deployed infrastructure and the transmit power used etc. Each RAT has its own energy consumption profile. Using multiple radio accesses for a user's data transmissions is associated to an additional energy cost, especially for schemes that improve robustness by introducing redundancy. The fundamental problem is how to select and use multiple radio accesses in an energy efficient way.

Finding an energy-efficient solution would be an advantage both at the network side, e.g., to reduce running costs, and at the mobile station devices to increase battery lifetime and improve the user experience.

Thus, the known prior art does not provide an efficient solution to directly control energy saving at the mobile station in a future heterogeneous and dense network.

SUMMARY

It is therefore an object to obviate at least some of the above mentioned disadvantages and to allocate radio access resources to a mobile station within a wireless communication network.

This and other objects are achieved by the features of the appended independent claims. Further implementation forms are apparent from the dependent claims, the description and the figures.

According to a first aspect, a network node is provided, configured for radio access resource allocation of a mobile station within a wireless communication system. The wireless communication system may comprise the network node and the mobile station. The network node comprises a receiver. The receiver is configured to receive at least one first parameter value associated with a radio communication condition of the mobile station. The receiver is also configured to receive at least one second parameter value associated with communication capabilities of the mobile station. Further, the receiver is configured to receive at least one third parameter value indicating operability in Multi-Radio Transmit Diversity (MRTD) of the mobile station. The network node also comprises a processor, configured to allocate at least one radio access resource to the mobile station, based on the received parameter values. In addition, the network node also comprises a transmitter, configured to inform the mobile station of the at least one allocated radio access resource.

Thanks to the disclosed solution for providing radio access resource allocation to a mobile station, both system and user throughput may be improved while keeping the energy cost low, in particular on the mobile side. Thereby, thanks to improved energy efficiency by reduced energy spent per served bit, power consumption of the mobile station may be reduced.

It is thereby enabled to save energy at the mobile station and thus prolong battery lifetime between reloads for the mobile station.

In a first possible implementation of the network node according to the first aspect, the at least one first parameter value associated with radio communication conditions of the mobile station may comprise radio access conditions, radio access quality, channel quality, received signal strength or similar as perceived by the mobile station.

Thereby, the mobile station may be allocated a radio access resource adapted to the current radio communication conditions of the mobile station, e.g. in terms of QoS demands of a user's service.

In a second possible implementation of the network node according to the first aspect, or the first possible implementation thereof, the at least one second parameter value associated with communication capabilities of the mobile station may comprise energy efficiency of the mobile station, energy consumption rate of the mobile station, transmission delay, energy consumption rate per bit, remaining battery capacity of the mobile station, capability and/or quality-of-service demands of the mobile station.

Thus the mobile station may provide the energy status of the mobile station to the network node, in order to enable the first network node to determine an appropriate configuration of the mobile station, based on the energy status of the mobile station, for prolonging battery operational lifetime between recharge.

Thus the network node may invoke energy-saving information such as battery level of the mobile station from the mobile station and/or a preferred or accepted energy-saving configuration of parameters associated with an operation of the mobile station and thereby control energy management within the cell, not only on the network side but also on the mobile station side, rendering reduced energy consumption.

In a third possible implementation of the network node according to the first aspect, or any previous possible implementation thereof, the at least one third parameter value indicating operability in multi-radio transmit diversity of the mobile station may comprise a model indication of the mobile station.

By knowing the model of the mobile station, and by mapping the model ID reference against a database, the network node may extract the operability in MRTD of the mobile station. It may thereby be avoided to allocate resources to the mobile station that cannot be used by the mobile station.

In a fourth possible implementation of the network node according to the first aspect, or any previous possible implementation thereof, the processor comprised in the network node may be configured to allocate at least one radio access resource to the mobile station, further based on transmission performance parameters within the wireless communication system. Such transmission performance parameters may comprise e.g. spectral efficiency or user throughput of a transmission made by the mobile station and/or estimation of the user throughput based on equations for different MRTD schemes and/or the number of mobile stations which have been allocated a certain radio access resource.

Thus the allocation of resources to the mobile station in question may be made also with regard to the overall transmission performance within the wireless communication system.

In a fifth possible implementation of the network node according to the first aspect, or any previous possible implementation thereof, the processor may be configured to allocate the at least one radio access resource to the mobile station continuously, or at a predetermined time interval.

By repeating the allocation of resources over time, a dynamic optimisation may be performed, adapting the resource allocation to the current radio propagation conditions and QoS requests of the mobile station. Thereby energy costs may be further reduced thanks to improved energy efficiency.

In a sixth possible implementation of the network node according to the first aspect, or any previous possible implementation thereof, the processor may be configured to determine a utilisation mode of the allocated plurality of radio access resources based on the received parameter values. The processor may be configured to instruct the mobile station to utilise the allocated radio access resource by MRTD according to the utilisation mode. Such utilisation mode may comprise e.g. switched-MRTD, where only one radio access resource may be used by the mobile station at any time; parallel-MRTD, where multiple radio access resources may be used simultaneously; or no-MRTD, where only one specific radio access resource may be used at all times.

An advantage therewith comprises improved radio resource allocation.

In a seventh possible implementation of the network node according to the first aspect, or any previous possible implementation thereof, the processor may also be configured to divide the allocated radio access resources into a number of mutually exclusive sets each comprising a plurality of radio access resources and where different combinations of MRTD, user scheduling and radio access resource allocation may be determined.

Thereby energy efficiency within the wireless communication system may be further improved. Thus also energy may be saved at the mobile station by enabling the serving network node to configure appropriate parameters based on the mobile station's information.

In an eighth possible implementation of the network node according to the first aspect, or any previous possible implementation thereof, the processor may also be configured to instruct the mobile station utilisation of the allocated radio access resources by redundant transmission. The processor may also be configured to indicate a radio access resource to use for data transmission and a radio access resource to use for signalling.

By enabling redundant uplink transmissions over parallel radio resources, communication may be made also when the radio propagation conditions are rough, as may be the case when the mobile station is situated at the cell border, or being subject to interference, for example. The transmitted information may then be combined at the receiver side, or at an aggregating node at the network side.

In a ninth possible implementation of the network node according to the first aspect, or any previous possible implementation thereof, the processor may be configured to compute and instruct measurement and signalling overhead of the mobile station, to the mobile station, such as how often the mobile station is to measure and report over different radio access resources. Thereby the processor may be further configured to compute measurement and report frequency of the mobile station. Further, the processor may also be configured to indicate a radio access resource to use for data transmission and a radio access resource to use for signalling.

Thereby, timely and energy-efficient cell detection and monitoring such as signal measurements at the mobile station are assured. Further, by enabling a brief but precise periodic monitoring time for the mobile station, distributed to appropriate periodic occasions, the battery operative time of the mobile station may be prolonged, leading to a potentially enhanced user experience. Thus energy is saved at the mobile station by enabling the serving network node to configure appropriate parameters based on the mobile station's information.

In a tenth possible implementation of the network node according to the first aspect, or any previous possible implementation thereof, the processor may be configured to allocate at least one radio access resource to the mobile station, further based on a combination of: MRTD, user scheduling, throughput performance or energy performance. Thereby, the processor may determine which at least one radio access resource to allocate to the mobile station, further based on a combination of MRTD, user scheduling and radio access resource allocation for throughput performance, energy performance or a combination of throughput performance and energy performance.

Thereby transmission performance may be further improved, while also improving energy efficiency and further reducing power consumption of the mobile station.

In an eleventh possible implementation of the network node according to the first aspect, or any previous possible implementation thereof, the processor may be configured to determine which at least one radio access resource to allocate to the mobile station, based on a combination of MRTD and maximum radio access resource rate allocation. The processor may alternatively be configured to determine which at least one radio access resource to allocate to the mobile station based on a combination of MRTD and minimum radio access resource energy consumption allocation.

Thus feasible alternative implementations are provided for further radio resource allocation improvement.

In a twelfth possible implementation of the network node according to the first aspect, or any previous possible implementation thereof, the processor may be configured to determine a list of candidate mobile stations to be allocated radio access resources, based upon the at least one first, second and third parameter values associated with the mobile station and an estimate of the total network performance. The processor may also be configured to determine which transmission performance parameters the mobile station is to measure and report. Thereby the processor may determine a list of candidate mobile stations for subsets of radio resources, based upon the at least one first, second and third parameter values associated with the mobile station and an estimate of the total network performance. Further, the processor may be configured to determine which transmission performance parameters the mobile station is to measure and instruct the mobile stations to report transmission performance parameters for the corresponding subset of the radio access resources.

Thereby transmission performance may be further improved, while also improving energy efficiency and further reducing power consumption of the mobile station.

In a thirteenth possible implementation of the network node according to the first aspect, or any previous possible implementation thereof, the allocated radio access resources may belong to different radio access technologies such as e.g. 3GPP LTE and Wi-Fi.

Thereby, a solution is achieved that may benefit from the diversity of a multi-radio environment by allocating radio access resources that for the current moment has the best performance. Thus dynamic switching of mobile station across different radio access resources belonging to different radio access technologies is achieved, further enhancing the enumerated advantages.

According to a second aspect, a method in a network node is provided, for radio access resource allocation of a mobile station within a wireless communication system. The wireless communication system comprises the network node and the mobile station. The method comprises receiving at least one first parameter value associated with a radio communication condition of the mobile station. Further, the method comprises receiving at least one second parameter value associated with communication capabilities of the mobile station. In addition the method also comprises receiving at least one third parameter value indicating operability in multi-radio transmit diversity of the mobile station. The method also comprises allocating at least one radio access resource to the mobile station, based on the received parameter values. Furthermore, the method in addition comprises informing the mobile station of the at least one allocated radio access resource. Such information may be made e.g. by transmitting a radio resource utilisation message indicating the at least one radio access resource allocated to the mobile station.

Thanks to the disclosed solution for providing radio access resource allocation to a mobile station, both system and user throughput may be improved while keeping the energy cost low, in particular on the mobile side. Thereby, thanks to improved energy efficiency by reduced energy spent per served bit, power consumption of the mobile station may be reduced.

It is thereby enabled to save energy at the mobile station and thus prolong battery lifetime between reloads for the mobile station.

In a first possible implementation of the method according to the second aspect, the at least one first parameter value associated with radio communication conditions of the mobile station may comprise radio access conditions, radio access quality, channel quality, received signal strength or similar as perceived by the mobile station.

Thereby, the mobile station may be allocated a radio access resource adapted to the current radio communication conditions of the mobile station, e.g. in terms of QoS demands of a user's service.

In a second possible implementation of the method according to the second aspect, or the first possible implementation thereof, the at least one second parameter value associated with communication capabilities of the mobile station may comprise energy efficiency of the mobile station, energy consumption rate of the mobile station, transmission delay, energy consumption rate per bit, remaining battery capacity of the mobile station, capability and/or quality-of-service demands of the mobile station.

Thus the mobile station may provide the energy status of the mobile station to the network node, in order to enable the first network node to determine an appropriate configuration of the mobile station, based on the energy status of the mobile station, for prolonging battery operational lifetime between recharge.

In a third possible implementation of the method according to the second aspect, or any previous possible implementation thereof, the at least one third parameter value indicating operability in multi-radio transmit diversity of the mobile station may comprise a model indication of the mobile station.

By knowing the model of the mobile station, and by mapping the model ID reference against a database, the network node may extract the operability in MRTD of the mobile station. It may thereby be avoided to allocate resources to the mobile station that cannot be used by the mobile station.

In a fourth possible implementation of the method according to the second, or any previous possible implementation thereof, the processor comprised in the network node may be configured to determine at least one radio access resource to allocate to the mobile station, further based on transmission performance parameters within the wireless communication system. Such transmission performance parameters may comprise e.g. spectral efficiency or user throughput of a transmission made by the mobile station, estimation of the user throughput based on equations for different MRTD schemes, the number of mobile stations which have been allocated a certain radio access resource.

Thus the allocation of resources to the mobile station in question may be made also with regard to the overall transmission performance within the wireless communication system.

In a fifth possible implementation of the method according to the second aspect, or any previous possible implementation thereof, the processor may be configured to repeat allocation of the at least one radio access resource to the mobile station continuously, or at a predetermined time interval.

By repeating the allocation of resources over time, a dynamic optimisation may be performed, adapting the resource allocation to the current radio propagation conditions and QoS requests of the mobile station. Thereby energy costs may be further reduced thanks to improved energy efficiency.

In a sixth possible implementation of the method according to the second aspect, or any previous possible implementation thereof, the processor may be configured to determine how the mobile station is to combine the utilisation of the allocated plurality of radio access resources for communication within the wireless communication system, based on the received parameter values. The processor may also be configured to instruct the mobile station to utilise the allocated radio access resource by MRTD. The MRTD variety may comprise e.g. switched-MRTD, where only one radio access resource may be used by the mobile station at any time; parallel-MRTD, where multiple radio access resources may be used simultaneously; or no-MRTD, where only one specific radio access resource may be used at all times.

An advantage therewith comprises improved radio resource allocation.

In a seventh possible implementation of the method according to the second aspect, or any previous possible implementation thereof, the processor may also be configured to divide the allocated radio access resources into a number of mutually exclusive sets each comprising a plurality of radio access resources and wherein different combinations of MRTD, user scheduling and radio access resource allocation may be determined.

Thereby energy efficiency within the wireless communication system may be further improved. Thus also energy may be saved at the mobile station by enabling the serving network node to configure appropriate parameters based on the mobile station's information.

In an eighth possible implementation of the method according to the second aspect, or any previous possible implementation thereof, the processor may also be configured to instruct the mobile station how to utilise the allocated radio access resources by redundant transmission. Additionally, the processor may be configured to indicate which radio access resource to use for data transmission and which radio access resource to use for signalling.

By enabling redundant uplink transmissions over parallel radio resources, communication may be made also when the radio propagation conditions are rough, as may be the case when the mobile station is situated at the cell border, or being subject to interference, for example. The transmitted information may then be combined at the receiver side, or at an aggregating node at the network side.

In a ninth possible implementation of the method according to the second aspect, or any previous possible implementation thereof, the processor may be configured to compute and instruct measurement and signalling overhead of the mobile station, to the mobile station, such as how often the mobile station is to measure and report over different radio access resources.

Thereby, timely and energy-efficient cell detection and monitoring such as signal measurements at the mobile station are assured. Further, by enabling a brief but precise periodic monitoring time for the mobile station, distributed to appropriate periodic occasions, the battery operative time of the mobile station may be prolonged, leading to a potentially enhanced user experience. Thus energy is saved at the mobile station by enabling the serving network node to configure appropriate parameters based on the mobile station's information.

In a tenth possible implementation of the method according to the second aspect, or any previous possible implementation thereof, the processor may be configured to determine which at least one radio access resource to allocate to the mobile station, further based on a combination of MRTD, user scheduling and radio access resource allocation for throughput performance, energy performance or a combination of throughput performance and energy performance.

Thereby transmission performance may be further improved, while also improving energy efficiency and further reducing power consumption of the mobile station.

In an eleventh possible implementation of the method according to the second aspect, or any previous possible implementation thereof, the processor may be configured to determine which at least one radio access resource to allocate to the mobile station, based on a combination of MRTD and maximum radio access resource rate allocation. The processor may alternatively be configured to determine which at least one radio access resource to allocate to the mobile station based on a combination of MRTD and minimum radio access resource energy consumption allocation.

Thus feasible alternative implementations are provided for further radio resource allocation improvement.

In a twelfth possible implementation of the method according to the second aspect, or any previous possible implementation thereof, the processor may be configured to determine a list of candidate mobile stations for subsets of radio resources, based upon the at least one first, second and third parameter values associated with the mobile station and an estimate of the total network performance. Further, the processor may be configured to determine which transmission performance parameters the mobile station is to measure and instruct the mobile stations to report transmission performance parameters for the corresponding subset of the radio access resources.

Thereby transmission performance may be further improved, while also improving energy efficiency and further reducing power consumption of the mobile station.

In a thirteenth possible implementation of the method according to the second aspect, or any previous possible implementation thereof, the allocated radio access resources may belong to different radio access technologies.

Thereby, a solution is achieved that may benefit from the diversity of a multi-radio environment by allocating radio access resources that for the current moment has the best performance. Thus dynamic switching of mobile station across different radio access resources belonging to different radio access technologies is achieved, further enhancing the enumerated advantages.

According to another aspect, a computer program in a network node according to the first aspect, or any possible implementation thereof, is provided, comprising program code for performing a method according to the second aspect, or any possible implementation thereof, when the computer program runs on a computer.

Thanks to the disclosed solution for providing radio access resource allocation to a mobile station, both system and user throughput may be improved while keeping the energy cost low, in particular on the mobile side. Thereby, thanks to improved energy efficiency by reduced energy spent per served bit, power consumption of the mobile station may be reduced.

It is thereby enabled to save energy at the mobile station and thus prolong battery lifetime between reloads for the mobile station. Thereby an improved performance within the wireless communication network is provided.

Other objects, advantages and novel features of the described aspects will become apparent from the following detailed description.

BRIEF DESCRIPTION OF THE DRAWINGS

Various implementation forms are described in more detail with reference to the appended drawings, illustrating different examples of embodiments in which.

DETAILED DESCRIPTION

Embodiments of the invention described herein are defined as a network node and a method in a network node, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
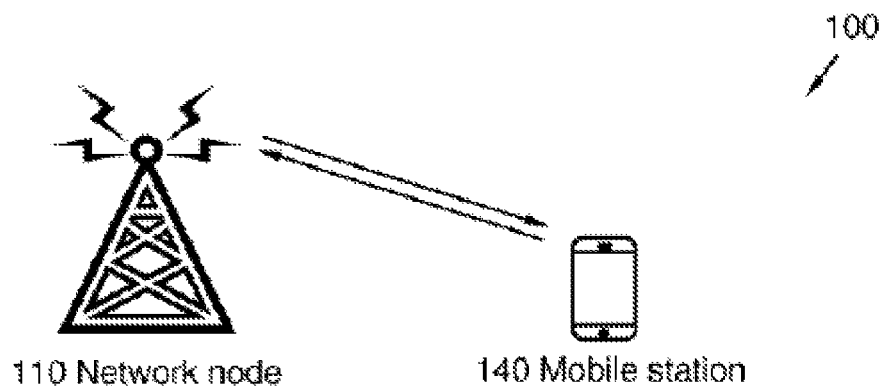
FIG. 1A is a block diagram illustrating a wireless communication network according to some embodiments.

FIG. 1A is a schematic illustration over a wireless communication system 100 comprising a network node 110 and a mobile station 140. The mobile station 140 may be served by the network node 110, thereby being connected to the wireless communication system 100.

The wireless communication system 100 may at least partly be based on one or more radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), Wireless Local Area Networks (WLAN), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options. The expressions "wireless communication network", "wireless communication system" and/or "cellular telecommunication system" may within the technological context of this disclosure sometimes be utilised interchangeably. Further, the terms radio network node, network node, base station, and cell may be used interchangeably in the sequel, as well as the expressions "mobile device", "mobile station", "user" and "UE".

The purpose of the illustration in FIG. 1A is to provide a simplified, general overview of the wireless communication system 100 and the involved methods and nodes, such as the network node 110 and the mobile station 140 herein described, and the functionalities involved.

The illustrated network node 110 comprised in the wireless communication system 100 may send and receive radio signals in order to communicate wirelessly with the mobile station 140.

Figure 1B:
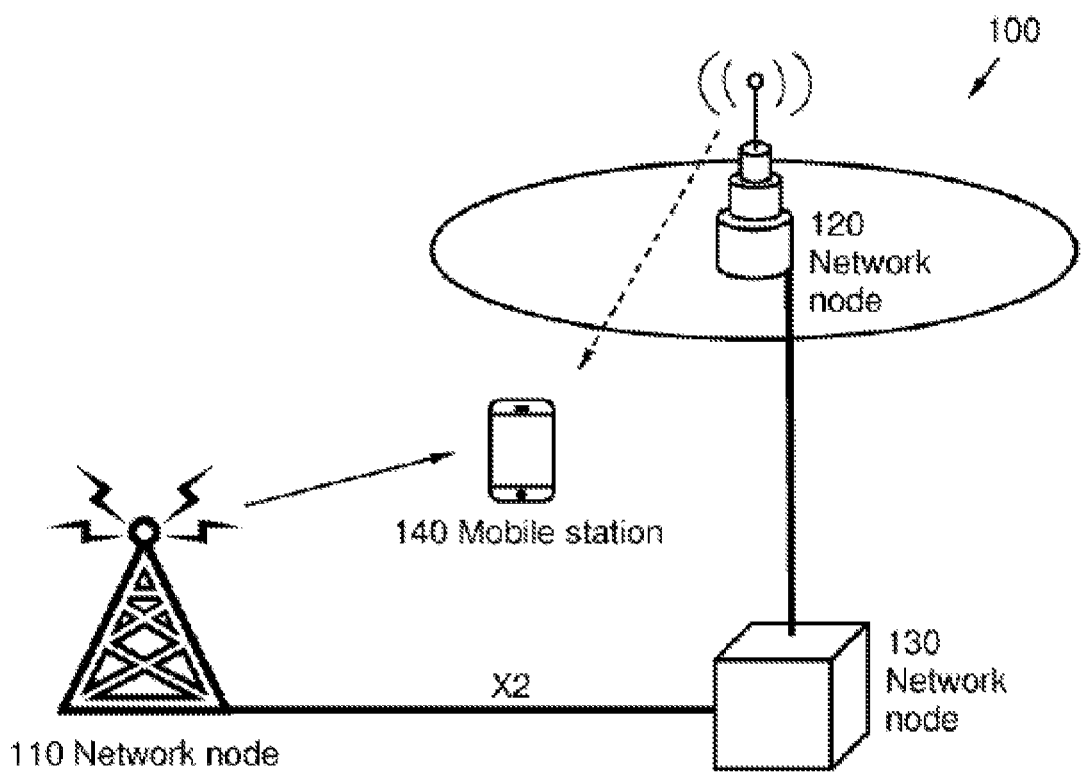
FIG. 1B is a block diagram illustrating a wireless communication network according to some embodiments.

FIG. 1B is a schematic illustration over an alternative implementation of the wireless communication system 100 comprising the network node 110, another network node 120 and yet another network node 130 and the mobile station 140. The mobile station 140 may be served by the network node 110, and/or by the other network node 120, thereby being connected to the wireless communication system 100.

In some embodiments, the network node 110 may be configured for communication using a first set of radio access resources, such as e.g. LTE and GSM while the other network node 120 is configured for a different set of radio access resources, such as e.g. Wi-Fi.

According to some embodiments any of the network nodes 110, 120, 130 may indicate to the mobile station 140 which radio access resource to utilise, based on a model for e.g. throughput and energy consumption to achieve performance goals for both the system throughput and the mobile station energy consumption. Thus the control and resource allocation may be performed in a separate network node 130, lacking own radio communication ability. Such node 130 may sometimes be referred to as a control node or similar, and it may be situated anywhere within the wireless communication system 100. However, the control and resource allocation may in other embodiments be performed in any of the network nodes 110, 120 having radio communication ability, which thus function as a master node, for example in a Hetnet setup.

There may be a trade off where the system throughput is maximized when the number of mobile stations 140 that are available to be scheduled on each radio access resource is as high as possible, but the energy consumption for the mobile stations increase when they need to measure and report the channel condition on multiple radio access resources.

The network node 110, 120, 130 that controls the mobile stations 140 may collect information about the mobile stations' energy consumption of different interfaces.

This information may typically be relatively static, therefore it may alternatively in some embodiments be collected from higher layers and transferred to the network node 110, 120, 130 handling MRTD. The format of the energy profile may be standardised, then each device model may need to be profiled and the parameters provided in the standardised profile format.

The network node 110, 120, 130 may then select a specific number of radio access resource for each mobile station 140 so that the total number of mobile stations on each radio access resource is sufficient to give a high enough system throughput, i.e. the probability of having users with good channel quality is high enough. For each mobile station 140 the network node 110, 120, 130 indicates how the radio access resources may be used for transmitting and receiving data, by determining the scheduling and assignment rules. In addition, it may also indicate for each mobile station 140 how the radio access resource monitoring that would allow switching between radio access resources may be performed.

The scheme utilised by the network node 110, 120, 130 may be configured to improve transmission performance, among others in terms of the spectral efficiency (bit/s/Hz) and the user throughput (bits/s) of a user's transmissions. It may also be configured to improve energy efficiency, among others, by reducing the energy spent per served bit (Joules/bit). Further the utilised scheme may be further configured to reduce power consumption in the mobile station 140, among others, by selecting the best multi-path streaming solution.

According to some embodiments, simultaneous utilisation of co-existing networks at a packet or even at a frame level may be supported by means of joint scheduling and resource allocation mechanisms. To this end, some embodiments may be equally applicable to HetNet deployment scenarios.

Such mechanisms may allow dynamic selection among multiple radio interfaces for the transmission of a user's data. Some of the described embodiments may benefit from the diversity in such multi-radio environment by using the RAT that performs best at any time, then it may be in a better position to meet the QoS demands of a user's service. In this scenario, the dynamic switching of a single users flow across different radio access resources is feasible.

The utilisation of the radio access resources may be performed by means of Multi-Radio Transmit Diversity (MRTD) which may be broadly defined as the dynamic selection of multiple radio accesses for the transmission of a user's data and it may be realised of as consisting of a packet scheduler operating across multiple radio interfaces. Here the term radio access is used to refer to uncoupled radio channels either across different RATs or within a single RAT. An example of uncoupled radio channels within a single RAT is the use of multiple carrier frequencies in a specific radio standard. As in any other form of diversity, the assumption that uncoupled RAs are mostly independent implies the probability that all RAs are in deep fade simultaneously is reduced. Consequently, the probability of selecting a single radio access resource of sufficient quality may increase. Therefore, MRTD principally consists of a multi-radio selection policy, which assigns a radio access resource to each scheduled data-unit according to a set of radio access resource quality metrics. Assuming data-units of size equal to packets, MRTD may be thought of as consisting of a packet scheduler operating across multiple radio interfaces where packets belonging to the transmission of a user's data are scheduled over one or more radio access resources.

Provided that the mobile station 140 is capable of transmission and reception over multiple radio access resources, the diversity exploiting components offered to the selection process are: re-selection rate, parallelism and redundancy.

Re-selection rate represents the inverse of the time interval over which a specific diversity selection decision is applied to the transmission process. In principle, the re-selection rate is a continuous variable, but in practice it may correspond to the time interval required for the transmission or processing of a Physical-(PHY)- or Multiple Access Control (MAC)-layer Protocol Data Unit (PDU), multiple Internet Protocol (IP) packets, or, in the extreme, the whole duration of a communication session.

Parallelism refers to the possibility of selecting multiple radio access resources at any given time for the transmission processing of a user's data. For switched diversity, where only one radio access resource is selected at a time, the parallelism is zero.

Redundancy refers to the possibility of transmitting copies of the same data over multiple radio access resources as part of the transmission diversity mechanism. This is in addition to Automatic Repeat-reQuest (ARQ) re-transmissions inherent in the radio access resource-specific Radio Link Control (RLC)/MAC layers.

Different MRTD schemes may be envisaged through various combinations of access re-selection rate, transmission parallelism and transmission redundancy. In this context, MRTD means the data flow split between two communicating entities over more than one radio access resources.

Within the wireless communication system 100, comprised network nodes 110, 120, 130 may provide multiple radio access resources, sometimes referred to as Radio Accesses (RAs). In one example, a radio access resource may comprise a radio channel associated with a Radio Access Technology (RAT), available at the network node 110, 120, 130.

Furthermore network nodes 110, 120, 130 in different embodiments may provide different radio access resources and different amount of radio access resources, as already mentioned. According to an arbitrary and non-limiting example, the wireless communication system 100 comprises network nodes 110, 120 that provide a single, or a multiplicity, of different radio access resources that the mobile station 140 may utilise.

The utilisation of the radio access resources may be performed by means of Multi-Radio Transmit Diversity (MRTD) which may be broadly defined as the dynamic selection of multiple radio accesses for the transmission of a user's data and it may in some embodiments comprise e.g. a packet scheduler operating across multiple radio interfaces.

The disclosed method in the wireless communication system 100 for allocating and utilising a multiplicity of radio access resources for the transmission, including signalling, of user data may take capacity and energy efficiency performance indicators into account.

According to some embodiments, wherein a multiplicity of radio access resources are allocated, the network node 110, 120, 130 may control the usage of multiple interfaces for the mobile station 140, and each other mobile station within radio range, by performing at least some of the following actions.

Any, some or all of the network nodes 110, 120, 130 within the wireless communication system 100 may collect information of mobile station specific energy consumption parameters, e.g. channel model parameters for the different interfaces, battery status or energy saving preferences, and possibly also quality-of-service demands related to communication by the mobile station 140. This information may be reported directly by the mobile station 140, or it may alternatively be collected from other network entities, such as subscriber databases and session/QoS management entities. This information may be relatively static, and typically only require update as sessions start or end, or periodically on a time scale of minutes in different embodiments.

Furthermore, the network node 110, 120, 130 within the wireless communication system 100 may indicate to the mobile station 140 for which radio access resources the channel conditions for the mobile station 140 are to be measured and reported. Such measurement may be made either directly by the mobile station 140, or the network node 110, 120, 130 depending on the procedures supported by the utilised radio access technologies.

For this purpose system throughput equations may be used, which may estimate the average system throughput as a function of the number of users and the number of radio access resources. The number of radio access resources the mobile station 140 is to monitor may be selected to achieve a system throughput goal.

Furthermore, in some embodiments, the network node 110, 120, 130 may in addition decide on the number of radio access resources to activate, based on the total required throughput.

Thus mobile station 140, and possibly other mobile stations within cell, may report the measured channel properties of the radio access resources they have been instructed to monitor, and the network node 110, 120, 130 may determine how to allocate the available radio resources of the radio access resources to the mobile station 140, and possibly other mobile stations within cell. The allocation of the radio access resources for transmission or reception of data may then be signalled to the mobile station 140.

The utilisation of multiple radio access resources may refer to an enhancement of MRTD scheme and its implementations to take into account energy efficiency.

It may further be noted that the illustrated network setting in FIG. 1A of one instance of the network node 110 and one mobile station 140, and/or three instances of the network node 110, 120, 130 and one mobile station 140 in FIG. 1B are to be regarded as a non-limiting examples of embodiments only. The wireless communication network 100 may comprise any other number and/or combination of the discussed network nodes 110, 120, 130 and/or mobile stations 140. A plurality of mobile stations 140 and another configuration of network nodes 110, 120, 130 may thus be involved in some embodiments of the disclosed invention. When reference is made herein to "the other network node 120", the at least one other network node 120 may comprise a set of a plurality of other network nodes, according to some embodiments.

Thus whenever "one" or "a/an" network node 110, other network node 120, further network node 130 net and/or mobile station 140 is referred to in the present context, a plurality of the network nodes 110, 120, 130 and/or mobile stations 140 may be involved, according to some embodiments.

Further, the network node 110 and the other network node 120, according to some embodiments, may be configured for downlink transmission and uplink reception, and may be referred to, respectively, as e.g., a base station, a NodeB, an evolved Node Bs (eNB, or eNode B), a base transceiver station, an Access Point Base Station, a base station router, a Radio Base Station (RBS), a micro base station, a pico base station, a femto base station, a Home eNodeB, a sensor, a beacon device, a relay node, a repeater or any other network node configured for communication with the mobile station 140 over a wireless interface, depending, e.g., of the radio access technology and/or terminology used.

The mobile station 140 may correspondingly be represented by, e.g. a wireless communication terminal, a mobile cellular phone, a Personal Digital Assistant (PDA), a wireless platform, a user equipment, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the first network node 110 and/or the other network node 120, according to different embodiments and different vocabulary.

Some embodiments of the invention may define a modular implementation approach, and make it possible to reuse legacy systems such as e.g. standards, algorithms, implementations, components and products.

Given G radio access resources, and K users, scheduling may comprise the process of identifying which subset of the K users that may be serviced at any Transmission Timing Interval (TTI). Radio access resource allocation may thus comprise the problem of pairing each scheduled user, i.e. mobile station, with a radio access resource within the confines of the MRTD scheme. This situation is illustrated in FIG. 2.

Figure 2:
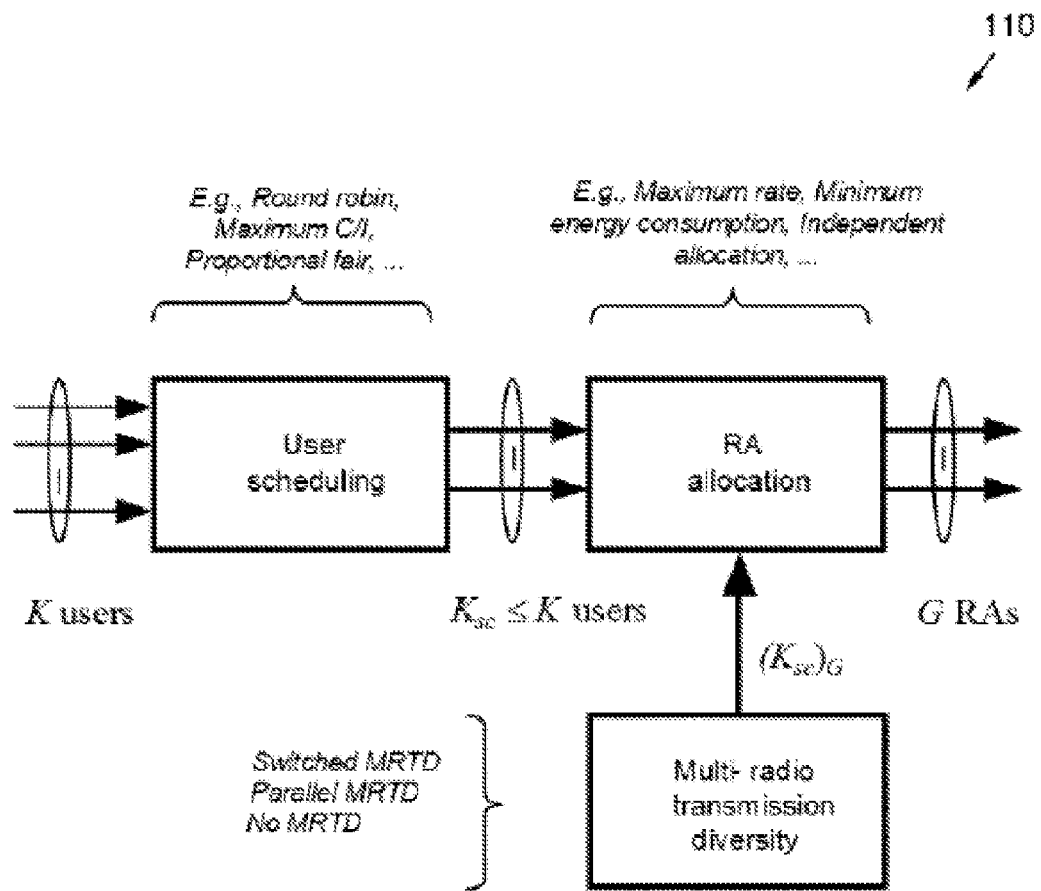
FIG. 2 is a block diagram illustrating allocation of radio access resources at a network node.

As depicted in FIG. 2, while scheduling may be optional in a multi-radio environment, allocation is mandatory. When scheduling is performed, only $K_{sc} \leq K_{backlogged\ users}$, i.e., users with non-empty queues of packets waiting for transmission, may be considered by the allocation scheme. When scheduling is not performed, all K users may be considered by the allocation scheme in some embodiments. In some embodiments wherein scheduling is performed $K_{sc}=G$; however for some diversity schemes it may be possible that not all scheduled users $K_{sc}$ may be allocated to the G radio access resources.

User scheduling decisions may be based on various input parameters such as for example user utility, service Quality of Service (QoS) and channel-quality and combinations thereof. Due to the impairments of the radio channels the most significant parameter and the one widely used by radio access technologies may be channel quality in terms of radio link characteristics comprising signal strength, interference level, Signal to Interference and Noise Ratio (SINR) and/or traffic load. With respect to channel quality, schedulers may be classified as channel-state independent and/or channel-state dependent with round-robin scheduling, where users are served in turns, and maximum-C/I scheduling, which serves users when their channel quality is at its best, as their respective pronounced representatives.

In general the allocation problem may be formulated as an optimisation problem for the maximisation of the system throughput. At each transmission time interval t, G (or less) users may be allocated to G radio access resources, resulting in (user, RA)-pairings which may be expressed e.g. in terms of a vector of pairs of indices as follows:

$$\{(k_1(t), g_1(t)) \wedge (k_G(t), g_G(t))\},$$

where $k_i(t)$ is the index of the $i^{th}$ scheduled user and $g_i(t)$ its paired radio access resource as determined by the radio access resource allocation strategy.

The resulting pairings may be constrained by the diversity scheme used. The following schemes may apply, in different embodiments:

Switched MRTD implies that each user, k, may utilise one and only one of the G radio accesses for data transmission at any TTI. The number of possible assignments is given by:

$$(K_{sc})_G = K_{sc} \cdot (K_{sc}-1)K(K_{sc}-G+1).$$

The radio access resource the mobile station 140 is allocated may be different from TTI to TTI.

Parallel MRTD implies that the mobile station 140 may utilise a multiplicity of the G radio accesses at any TTI. Consequently, the number of all pairings may be given by:

$$(K_{sc})_G = (K_{sc})^G.$$

No MRTD implies independent radio accesses, where the mobile station 140, and each user entering the system 100, may utilise one and only one single radio access resource. The number of assignments may again be given by: $(K_{sc})_G = K_{sc} \cdot (K_{sc}-1)K(K_{sc}-G+1)$, however once an assignment is chosen it remains the same throughout all TTIs.

Given the MRTD scheme selecting one among the sets of all possible pairings may be an optimisation problem best performed by means of radio access resource allocation strategies. A number of allocation strategies may be envisaged according to various embodiments.

In some embodiments, maximum rate allocation may be utilised. Thus, at each time t the complexity may be reduced by performing the allocation in G steps only. At each step, m, the (user, RA)-pairing that corresponds to the highest remaining achievable throughput at time t may be selected. According to some embodiments, $K_{[m]}$ and $G_{[m]}$ may denote the user/mobile station and the radio access resource to be selected at step m, then these may be found by the following expression:

$$(k_{[m]}, g_{[m]}) = \arg\max_{(u,a)} \{C_u^{(a)}(t)\} \quad (1)$$

subject to $u \in 1 \wedge K_{SC}, a \in 1 \wedge G,$ $$\begin{cases} u \notin \{k_{[i]} \mid i < m\}, a \notin \{g_{[i]} \mid i < m\}, & m-1 \wedge G \quad \text{if switched } MRTD \\ a \notin \{g_{[i]} \mid i < m\}, & m = 1 \wedge G \quad \text{if parallel } MRTD \end{cases}$$

where u and a may be indices of the user/mobile device and radio access resource of the $m^{th}$ pairing (m=1, 2, ..., G) and $C_{u_n}^{(a_n)}(t)$ may be the supported link throughput of $a_n$ over $u_n$. In case of switched MRTD, a user and a radio access resource that have once been considered in step i, they may not be taken into consideration in any successor step m, i.e., $\forall i<m$, $u \notin \{k_{[i]} | i<m\}$, $a \notin \{g_{[i]} | i<m\}$. The restriction for radio access resources also applies in the case of parallel MRTD, i.e., $\forall i<m$, $a \notin \{g_{[i]} | i<m\}$, while users may be considered in more than one steps and may be allocated to more than one radio access resource in some embodiments.

In some embodiments, independent allocation may be performed. This allocation scheme is identical to a scenario where users are divided into G groups; one group per radio access resource, and scheduled independently within each radio access resource. The allocation of the radio access resources to the users may be performed once at user arrival, typically the result of an admission control algorithm, and may remain fixed until user departure.

Figure 3:
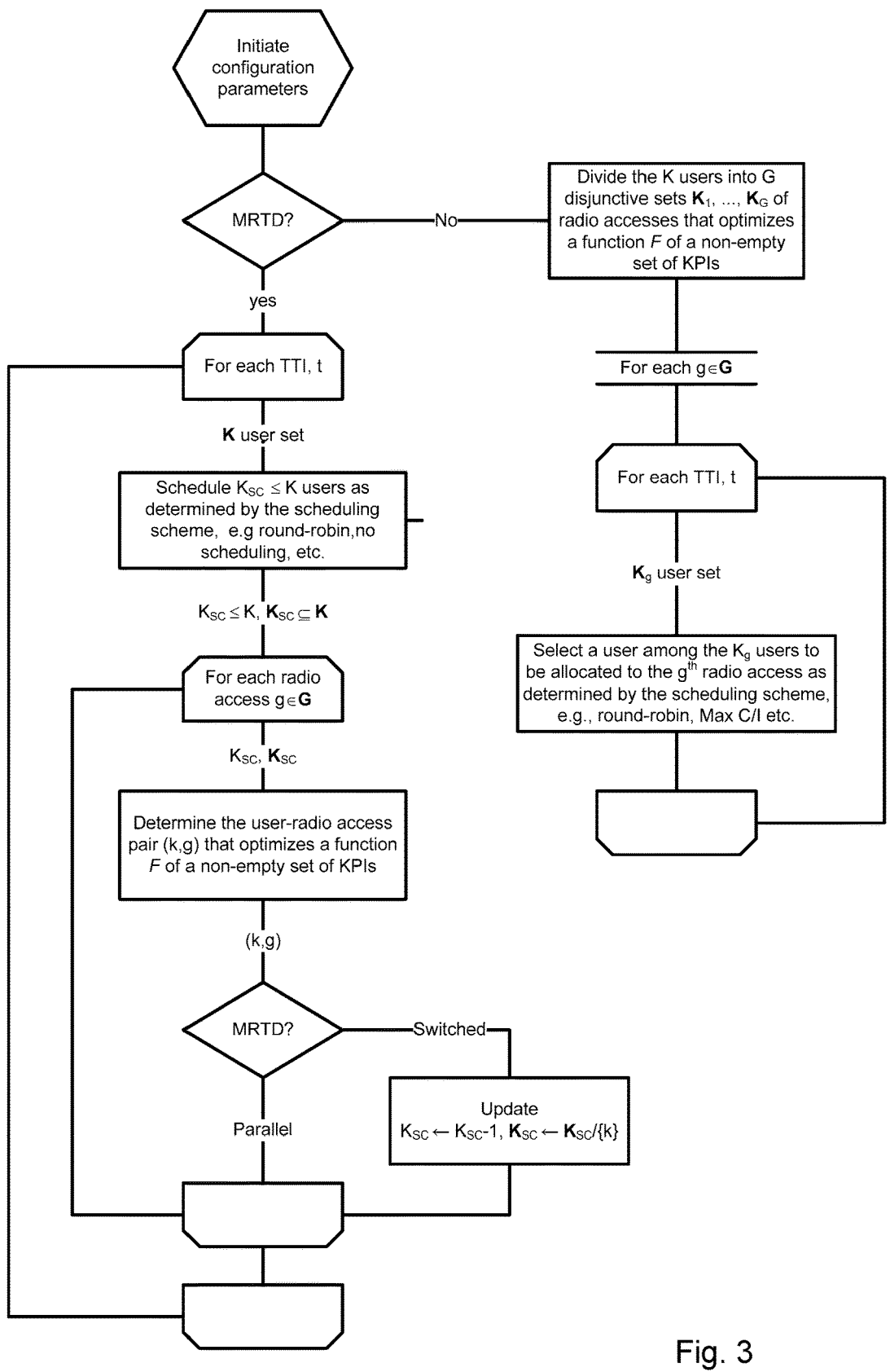
FIG. 3 is a flow chart illustrating a method in a mobile station according to an embodiment.

An implementation of the multi-radio access resource utilisation is shown in the flowchart of FIG. 3. A set of embodiments based on the combinations of user scheduling, radio access resource allocation and MRTD scheme are described below. FIG. 3 illustrates the general case where multi-radio access resource utilisation may optimise a function F of a non-empty set of Key Performance Indicators (KPIs) related to QoS, such as system throughput, user throughput, transmission delay, etc., and/or energy efficiency, such as energy consumption rate per bit, etc.

In one embodiment, MRTD may be based on maximum rate scheduling which combines MRTD with maximum rate radio access resource allocation (MRS). MRS may guarantee that, at any instant of time t, for transmission over the $g^{th}$ radio access the allocation mechanism may select the user (or one of the users) that may transmit with the highest link throughput. Consequently, the radio access resource allocation of MRS optimises a function F of the supportable link throughput as expressed in equation (1), i.e. $F=F(C_u^{(a)})$.

In another embodiment, an implementation of the method may comprise Switched MRTD based on Maximum Rate Scheduling (SMRTD, MRS) which combines Switched MRTD with maximum rate radio access resource allocation.

In a further embodiment, an implementation of the method may comprise Switched MRTD based on Round-Robin Scheduling (SMRTD, RRS) which combines Switched MRTD with maximum rate radio access resource allocation and round-robin user scheduling.

In other embodiments an implementation of the method may comprise Parallel MRTD based on Maximum Rate Scheduling (PMRTD, MRS) which combines parallel MRTD with maximum rate radio access resource allocation.

In another embodiment, an implementation of the method may comprise Parallel MRTD based on Round-Robin Scheduling (PMRTD, RRS) which combines parallel MRTD with maximum rate radio access resource allocation and round-robin user scheduling.

In yet another embodiment, an implementation of the method may comprise no MRTD based on Maximum Rate Scheduling (NMRTD, MRS) which combines independent radio access resource with maximum rate radio access resource allocation.

In another further embodiment an implementation of the method may comprise No MRTD based on Round-Robin Scheduling (NMRTD, RRS) which combines independent radio access resource with maximum rate radio access resource allocation and round-robin user scheduling.

In some embodiments, a simple linear model for energy consumption that may characterise power consumption of the mobile station 140 of any radio access technology may have the form:

$$P_y = \alpha_y^{dl} S_y^{dl} + \alpha_y^{ul} S_y^{ul} + \beta_y \quad (2)$$

where $S_y^{dl}$ and $S_y^{ul}$ are the downlink and the uplink effective throughput respectively, $\alpha_y^{dl}$ and $\alpha_y^{ul}$ are measured RAT specific parameters for the downlink reception and the uplink transmission respectively, and $\beta_y$ is a measured parameter that is different for different RATs and correspond to the power consumed during transmission but independently of the transmission rate. The energy model parameters may in general be specific to the model of the mobile station 140, and may be signalled from the mobile station 140 or stored in a database where the network node 110, 120, 130 may look-up the parameters for the mobile station 140, using information about the model of the mobile station 140, or used chipset. In some embodiments the above equation may be simplified to only comprise the downlink, hence, at each time t the power consumption for a radio access resource g may be obtained by:

$$P_g^{dl}(t) = \alpha_{y(g)}^{dl} S_g^{dl}(t) + \beta_{y(g)} \quad (3)$$

with $$S_g^{dl} = \overline{S}_g^{dl} T_g^{dl} \quad (4)$$

where $S_g^{dl}$ may denote the (effective) throughput in bits/s, $\overline{S}_g^{dl}$ may be the normalised throughput efficiency measured in percentage, $T_g^{dl}$ may be the nominal throughput in bits/s, and y(g) may be the RAT type of the $g^{th}$ radio access. The normalised throughput efficiency of a radio access may comprise the achieved throughput related to the net (or maximum achievable) bit rate in bit/s of the radio access. For example, if the effective throughput is 70 Mbit/s in a connection with a nominal throughput of 100 Mbit/s, the normalised throughput efficiency is 70%. In this example, effectively 70 Mbits of data are transmitted every second. Equivalently, the normalised throughput efficiency of a system may comprise the achieved system throughput related to the total net (or maximum achievable) bit rate in bit/s of the system in some embodiments.

The energy consumption per bit may be obtained by dividing the consumed power with the effective throughput:

$$E_g = \alpha_{y(g)}^{dl} + \frac{\beta_{y(g)}}{\overline{S}_g^{dl} T_g^{dl}} \quad (5)$$

In another embodiment, the number of active radio access resources in the network may be adapted so that there is always data to be transmitted to/from some user, i.e. the transmit buffers are never empty. Therefore, there will always be one device receiving over each of the radio accesses at any given time, and we can sum up the energy consumption of a receiver for each RAT. The average of the energy consumed for each radio access may be estimated by:

$$E = \frac{1}{G} \sum_{g=1}^{G} \left( \alpha_{y(g)}^{dl} + \frac{\beta_{y(g)}}{\overline{S}_g^{dl} T_g^{dl}} \right) \quad (6)$$

It may be clear from equation (4) and equation (5) that the energy efficiency may increase as the throughput increases, therefore the energy efficiency may differ between the different MRTD alternatives due to the different throughputs.

In a further embodiment the energy consumption for measuring and reporting the channel quality is considered when the network determines how many radio access resources the mobile station 140 shall monitor. When maximum rate allocation is considered the network may require channel quality information for all the radio accesses a user may be allocated to. Therefore, MRTD causes some extra energy consumption compared with independent accesses. The power consumption for channel measurement and reporting for radio access y may be denoted by $\chi_y$, the energy consumption per bit for a user connected to the $g^{th}$ radio access may be:

$$E_g = \alpha_{y(g)}^{dl} + \frac{\beta_{y(g)}}{S_g^{dl} T_g^{dl}} + \frac{1}{S_g^{dl} T_g^{dl}} \sum_{G \neq g} \chi_{y(g)} \quad (7)$$

The value of $\chi_y$ may typically be significantly lower than the energy consumption used during transmission. The exact relation may depend to at least some extent on the duty cycle for channel measurements, and also on the possibility to report inter-RAT channel measurements rather than signalling on each RAT. The energy consumption for MRTD may increase when there are many users within the cell and many radio accesses.

For MRTD the number of users that need to measure and report the channel quality for additional radio access resources may depend on whether the scheduling period (TTI) is large enough to avoid measurements and reporting during non-scheduled periods. For scheduling periods longer than the channel coherence time, or the channel quality report interval, this would typically be the case. If the scheduling periods are long enough the number of users that need to measure and report may be the number of scheduled users rather than the total number of users. In practice the number of users could lie somewhere in between the total number of users and the scheduled users, depending on the practical limitations of the measurement cycles in each RAT. In some embodiments the network node 110, 120, 130 may configure the measurement duty cycles so that the energy overhead due to measurements and signalling is kept low.

In some additional embodiments, the MRTD may be based on minimum energy consumption rate scheduling, which combines MRTD with Minimum Energy Consumption radio access resource allocation (MECS). MECS may guarantee that, at any instant of time t, for transmission over the $g^{th}$ radio access the allocation mechanism may select the user (or one of the users) that may transmit with the lowest energy consumption per bit. Here, again, at each time t the complexity may be reduced by performing the allocation in G steps only. At each step, m, the (user, RA)-pairing that corresponds to the lowest remaining energy consumption at time t may be selected. Furthermore, $k_{[m]}$ and $g_{[m]}$ may denote the user and the radio access resources to be selected at step m, thus these may be found by the following expression:

$$(k_{[m]}, g_{[m]}) = \arg \min_{(u,a)} \{E_u^{(a)}(t)\} \quad (8)$$

subject to $u \in 1 \wedge K_{SC}$, $a \in 1 \wedge G$,

-continued $$\begin{cases} u \notin \{k_{[i]} \mid i < m\}, a \notin \{g_{[i]} \mid i < m\}, & m = 1 \wedge G \text{ if switched } MRTD \\ a \notin \{g_{[i]} \mid i < m\}, & m = 1 \wedge G \text{ if parallel } MRTD \end{cases}$$

where u and a may be the indices of the user and radio access resources of the $m^{th}$ pairing (m=1∧ G) and $E_{u_n}^{(a_n)}(t)$ is the energy consumption rate per bit of $a_n$ over $u_n$. Again, in case of switched MRTD a user and a radio access resources that have once been considered in step i, they may not taken into consideration in any successor step m, i.e., $\forall i<m, u \notin \{k_{[i]} \mid i<m\}$, $a \notin \{g_{[i]} \mid i<m\}$. The restriction for radio access resources also applies in the case of parallel MRTD, i.e., $\forall i<m, a \notin \{g_{[i]} \mid i<m\}$, while users may be considered in more than one steps and be allocated to more than one radio access resources. As expressed in equation (8), the radio access resource allocation of MECS optimises a function F of the energy consumption rate, i.e., $F=F(E_u^{(a)})$.

In a further embodiment the radio access resource allocation may in general optimise a non-linear or linear combination, for a example a weighted sum, of the throughput and the energy efficiency, i.e., $F=F(C_u^{(a)}, E_u^{(a)})$.

The following embodiments exemplify how the network node 110, 120, 130 may calculate the normalised system throughput efficiency, in equations (4)-(7) as a function of the number of users it instructs to monitor each radio access resource.

In one embodiment the normalised system throughput efficiency under the conditions of Rayleigh distributed link throughput values for G radio accesses and K users (G≤K) for the case of parallel MRTD with maximum rate scheduling may be estimated by:

$$\overline{S}_{PMRTD,MRS} = \frac{1}{G} \sum_{g=1}^{G} K \int_0^1 \frac{x^2}{\sigma^2} \cdot \exp\left(-\frac{x^2}{2\sigma^2}\right) \cdot \left(1 - \exp\left(-\frac{x^2}{2\sigma^2}\right)\right)^{K-1} dx = \quad (9)$$

$$= K \int_0^1 \frac{x^2}{\sigma^2} \cdot \exp\left(-\frac{x^2}{2\sigma^2}\right) \cdot \left(1 - \exp\left(-\frac{x^2}{2\sigma^2}\right)\right)^{K-1} dx$$

In another embodiment the normalised system throughput efficiency under the conditions of Rayleigh distributed link throughput values for G radio accesses and K users (G≤K) for the case of parallel MRTD with round robin scheduling may be estimated by:

$$\overline{S}_{PMRTD,RRS} = \frac{1}{G} \sum_{g=1}^{G} \int_0^1 \frac{x^2}{\sigma^2} \cdot \exp\left(-\frac{x^2}{2\sigma^2}\right) \cdot \left(1 - \exp\left(-\frac{x_2}{2\sigma^2}\right)\right)^{G-1} dx = \quad (10)$$

$$= G \int_0^1 \frac{x^2}{\sigma^2} \cdot \exp\left(-\frac{x^2}{2\sigma^2}\right) \cdot \left(1 - \exp\left(-\frac{x^2}{2\sigma^2}\right)\right)^{G-1} dx$$

In a further embodiment the normalised system throughput efficiency under the conditions of Rayleigh distributed link throughput values for G radio accesses and K users (G≤K) for the case of switched MRTD with maximum rate scheduling may be estimated by:

$$\bar{S}_{SMRTD,MRS} = \quad (11)$$

$$\frac{1}{G}\sum_{g=1}^{G}(K-g+2)\int_{0}^{1}\frac{x^2}{\sigma^2}\cdot\exp\left(-\frac{x^2}{2\sigma^2}\right)\cdot\left(1-\exp\left(-\frac{x^2}{2\sigma^2}\right)\right)^{K-g+2}dx$$

In some other embodiments, the normalised system throughput efficiency under the conditions of Rayleigh distributed link throughput values for G radio accesses and K users (G≤K) for the case of switched MRTD with round robin scheduling may be estimated by:

$$\bar{S}_{SMRTD,RRS} = \quad (12)$$

$$\frac{1}{G}\sum_{g=1}^{G}(G-g+2)\int_{0}^{1}\frac{x^2}{\sigma^2}\cdot\exp\left(-\frac{x^2}{2\sigma^2}\right)\cdot\left(1-\exp\left(-\frac{x^2}{2\sigma^2}\right)\right)^{G-g+2}dx$$

In a further embodiment the normalised system throughput and/or throughput efficiency under the conditions of Rayleigh distributed link throughput values for G radio accesses and K users (G≤K) for the case of no MRTD with maximum rate scheduling may be estimated by:

In one embodiment the normalised system throughput efficiency under the conditions of uniform distributed link throughput values for G radio accesses and K users (G≤K) for the case of parallel MRTD with maximum rate scheduling may be estimated by:

$$\bar{S}_{PMRTD,MRS} = \frac{1}{G}\sum_{g=1}^{G}\frac{K_{sc}}{K_{sc}+1} = \frac{1}{G}\sum_{g=1}^{G}\frac{K}{K+1} = \frac{K}{K+1} \quad (15)$$

In another embodiment the normalised system throughput efficiency under the conditions of Rayleigh distributed link throughput values for G radio accesses and K users (G≤K) for the case of parallel MRTD with round robin scheduling may be estimated by:

$$\bar{S}_{PMRTD,RRS} = \frac{1}{G}\sum_{g=1}^{G}\frac{K_{sc}}{K_{sc}+1} = \frac{1}{G}\sum_{g=1}^{G}\frac{G}{G+1} = \frac{G}{G+1} \quad (16)$$

In yet anyone embodiment the normalised system throughput efficiency under the conditions of uniform distributed link throughput values for G radio accesses and K users (G≤K) for the case of switched MRTD with maximum rate scheduling may be estimated by:

$$\bar{S}_{NMRTD,MRS} = \frac{1}{G}\sum_{g=1}^{G}\frac{K}{G}\int_{0}^{1}\frac{x^2}{\sigma^2}\cdot\exp\left(-\frac{x^2}{2\sigma^2}\right)\cdot\left(1-\exp\left(-\frac{x^2}{2\sigma^2}\right)\right)^{\frac{K}{G}-1}dx = \quad (13)$$

$$= \frac{K}{G}\int_{0}^{1}\frac{x^2}{\sigma^2}\cdot\exp\left(-\frac{x^2}{2\sigma^2}\right)\cdot\left(1-\exp\left(-\frac{x^2}{2\sigma^2}\right)\right)^{\frac{K-G}{G}}dx$$

In another embodiment the normalised system throughput efficiency under the conditions of Rayleigh distributed link throughput values for G radio accesses and K users (G≤K) for the case of no MRTD with round robin scheduling may be estimated by:

$$\bar{S}_{SMRTD,MRS} = \frac{1}{G}\sum_{g=0}^{G-1}\frac{K_{sc}}{K_{sc}+1} = \frac{1}{G}\sum_{g=1}^{G}\frac{K-g+1}{K-g+2} = \quad (17)$$

$$\bar{S}_{NMRTD,RRS} = \frac{1}{G}\sum_{g=1}^{G}\int_{0}^{1}\frac{x^2}{\sigma^2}\cdot\exp\left(-\frac{x^2}{2\sigma^2}\right)\cdot\left(1-\exp\left(-\frac{x^2}{2\sigma^2}\right)\right)^{0}dx = \quad (14)$$

$$= \int_{0}^{1}\frac{x^2}{\sigma^2}\cdot\exp\left(-\frac{x^2}{2\sigma^2}\right)dx = \left[\frac{\sigma\cdot\sqrt{2\pi}}{2}\cdot erf\left(\frac{x\cdot\sqrt{2}}{2\sigma}\right)-x\cdot\exp\left(-\frac{x^2}{2\sigma^2}\right)\right]_{0}^{1} =$$

$$= \frac{\sigma\cdot\sqrt{2\pi}}{2}\cdot erf\left(\frac{\sqrt{2}}{2\sigma}\right)-\exp\left(-\frac{1}{2\sigma^2}\right)$$

-continued $$= \frac{1}{G}\left(\frac{K}{K+1} + \frac{K-1}{K} + \frac{K-2}{K-1} + \Lambda + \frac{K-G+1}{K-G+2}\right)$$
$$\underbrace{1\;4\;4\;4\;4\;4\;4\;4\;2\;4\;4\;4\;4\;4\;4\;3}_{G\text{ terms}}$$

$$= \frac{1}{G}(G + \Psi(-K+G-1) - \Psi(-K-1))$$

where $\Psi$ may denote the digamma function, which may be defined as the logarithmic derivative of the gamma function $$\Psi(z) = \frac{d}{dz}\log\Gamma(z) = \frac{\Gamma'(z)}{\Gamma(z)}.$$

In another embodiment the normalised system throughput efficiency under the conditions of uniform distributed link throughput values for G radio accesses and K users (G≤K) for the case of switched MRTD with round robin scheduling may be estimated by:

$$\overline{S}_{SMRTD,RRS} = \frac{1}{G}\sum_{g=0}^{G-1}\frac{K_{sc}}{K_{sc}+1} = \frac{1}{G}\sum_{g=1}^{G}\frac{G-g+1}{G-g+2} = \qquad (18)$$

$$= \frac{1}{G}\left(\frac{G}{G+1} + \frac{G-1}{G} + \frac{G-2}{G-1} + \Lambda + \frac{1}{2}\right)$$
$$\underbrace{1\;4\;4\;4\;4\;4\;2\;4\;4\;4\;4\;4\;3}_{G\text{ terms}}$$

$$= \frac{1}{G}(G - \Psi(G+2) + 1 - \gamma)$$

where γ may comprise the Euler-Mascheroni constant, which may be approximately equal to 0.577215664. For z=1, the digamma function as defined above may have the special value of $\Psi(1)=-\gamma$.

In one embodiment the normalised system throughput efficiency under the conditions of uniform distributed link throughput values for G radio accesses and K users (G≤K) for the case of no MRTD with maximum rate scheduling may be estimated by:

$$\overline{S}_{NMRTD,MRS} = \frac{1}{G}\sum_{g=1}^{G}\frac{K_{sc}}{K_{sc}+1} = \frac{1}{G}\sum_{g=1}^{G}\frac{\frac{K}{G}}{\frac{K}{G}+1} = \frac{\frac{K}{G}}{\frac{K}{G}+1} \approx \frac{L}{L+1}, \qquad (19)$$

$$\text{where } \left\lfloor\frac{K}{g}\right\rfloor = L \geq 0$$

In another additional embodiment the normalised system throughput efficiency under the conditions of uniform distributed link throughput values for G radio accesses and K users (G≤K) for the case of no MRTD with round robin scheduling may be estimated by:

$$\overline{S}_{NMRTD,RRS} = \frac{1}{G}\sum_{g=1}^{G}\frac{K_{sc}}{K_{sc}+1} = \frac{1}{G}\sum_{g=1}^{G}\frac{1}{1+1} = \frac{1}{2} \qquad (20)$$

The disclosed method according to various embodiments may allow more efficient utilisation of multiple radio interfaces. It may allow heterogeneous networks, i.e. Hetnets, to operate with high spectral and energy efficiency.

According to some alternative embodiments, the mobile station 140 may instead select which interfaces and access networks to use, thereby comprising a mobile station controlled interface selection. Since there are no guarantees that the mobile station 140 does what the network node 110, 120, 130 instructs it to do, the network node 110, 120, 130 may use the same signalling and may assume that most of the mobile stations within the cell may follow the instructions to achieve a better performance than if the mobile station 140 would determine autonomously which radio access resources to use, according to some embodiments.

Figure 4:
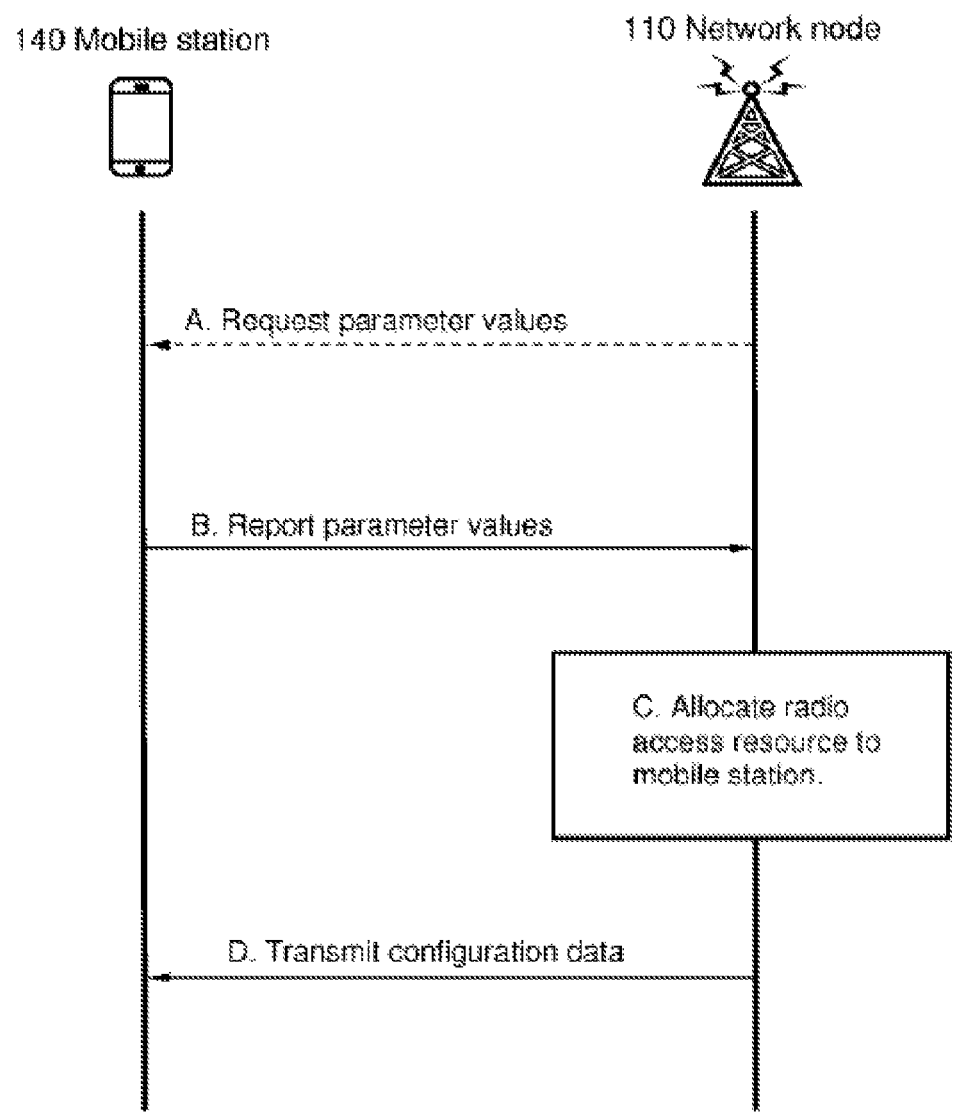
FIG. 4 is a block diagram illustrating communication between a network node and a mobile station according to an embodiment.

FIG. 4 illustrates communication between the network node 110 and the mobile station 140 according to an embodiment.

In a first action A, the network node 110 may request one or several parameter values from the mobile station 140. Such parameter values may comprise e.g. at least one first parameter value associated with a radio communication condition of the mobile station 140, at least one second parameter value associated with communication capabilities of the mobile station 140, and at least one third parameter value indicating operability in MRTD of the mobile station 140.

The mobile station 140 may then measure the requested parameter values and report them to the network node 110 in an action B.

Based on the collected parameter values of the mobile station 140, the network node 110 may allocate radio access resources to the mobile station 140, based on e.g. any of the above discussed algorithms in an action C. Thus the radio access resources to be allocated to the mobile station 140 may be determined, and also how the utilisation and signalling of these radio access resources are to be combined by the mobile station 140, while keeping the energy spent per bit by the mobile station 140 low, i.e. below a predetermined threshold level.

In an action D, information related to the radio access resources allocated to the mobile station 140, and/or other configuration data may be transmitted to the mobile station 140.

Figure 5:
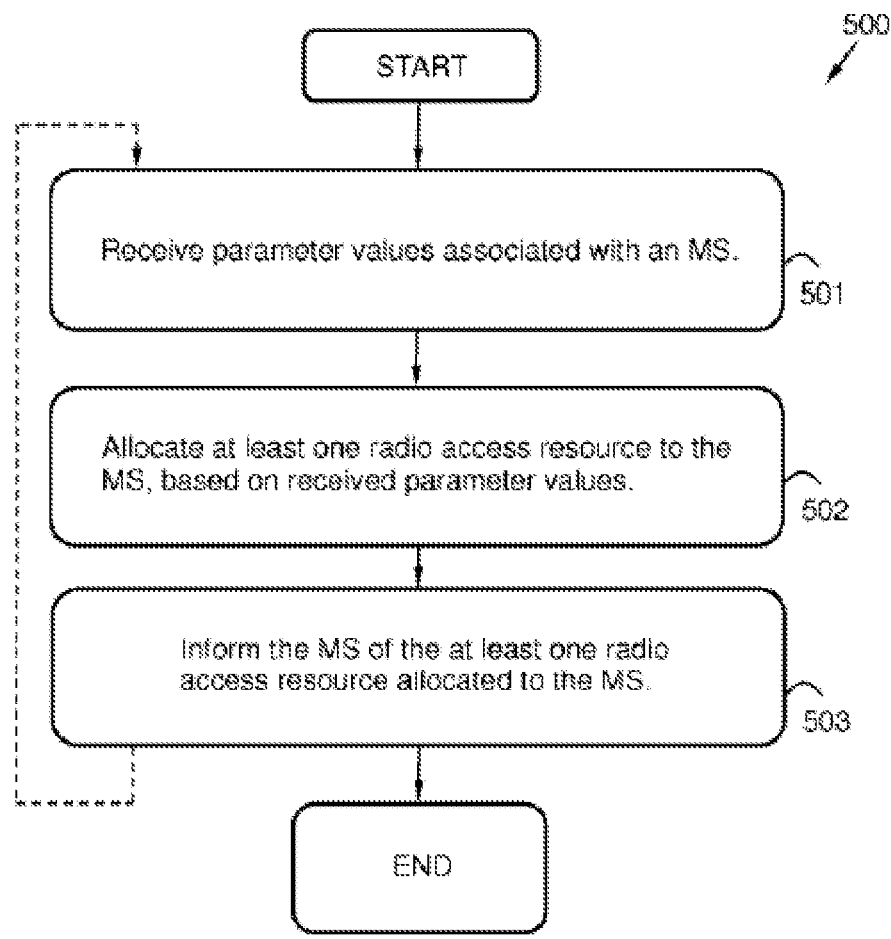
FIG. 5 is a flow chart illustrating a method in a network node according to an embodiment.

FIG. 5 is a flow chart illustrating embodiments of a method 500 for use in a network node 110, 120, 130 for radio access resource allocation of a mobile station 140 within a wireless communication system 100. The wireless communication system 100 comprises the network node 110, 120, 130 and the mobile station 140. The radio access resources to be allocated may belong to different radio access technologies in some embodiments, or may alternatively belong to the same radio access technology.

The wireless communication network 100 may be based on 3GPP LTE. The network node 110 and/or the other network node 120 may comprise an evolved NodeB (eNodeB) according to some embodiments.

To perform the radio access resource allocation of the mobile station 140, the method 500 may comprise a number of actions 501-503. It is however to be noted that any, some or all of the described actions 501-503, may be performed in a somewhat different chronological order than the enumeration indicates or be performed simultaneously according to different embodiments. Further, it is to be noted that some actions may be performed in a plurality of alternative manners according to different embodiments, and that some such alternative manners may be performed only within some, but not necessarily all embodiments. The method 500 may comprise the following actions:

Action 501

At least one first parameter value associated with a radio communication condition of the mobile station 140 is received. Further, at least one second parameter value associated with communication capabilities of the mobile station 140 is received. Additionally, at least one third parameter value indicating operability in multi-radio transmit diversity of the mobile station 140 is received.

Any, some or all of the enumerated parameter values may be received directly from the mobile station 140, e.g. according to a request. In some embodiments, the mobile station 140 may measure and transmit any, some or all of the parameter values continuously, at a predetermined time interval. However, in some embodiments, any, some or all of the parameter values may be obtained from an indirect source such as e.g. any network node 110, 120, 130 comprised in the system 100.

The at least one first parameter value associated with radio communication conditions of the mobile station 140 may comprises any, some or all of radio access conditions, radio access quality, channel quality, received signal strength or similar measurement as perceived by the mobile station 140.

Furthermore, the at least one second parameter value associated with communication capabilities of the mobile station 140 may comprise e.g. energy efficiency of the mobile station 140, energy consumption rate of the mobile station 140, transmission delay, energy consumption rate per bit, remaining battery capacity of the mobile station 140, capability and/or quality-of-service demands of the mobile station 140.

Thus the at least one second parameter value may indicate energy status of the mobile station 140, such as current battery level in some embodiments.

The at least third parameter may indicate that the mobile station parallel MRTD, switched MRTD or no MRTD. It may also indicate which radio accesses the mobile station may utilize for MRTD.

In addition, the at least one third parameter value indicating operability in multi-radio transmit diversity of the mobile station 140 may comprise a model indication of the mobile station 140.

Action 502

The at least one radio access resource is allocated to the mobile station 140, based on the received 501 parameter values.

However, in some embodiments, the at least one radio access resource to allocate to the mobile station 140 may be determined further based on transmission performance parameters within the wireless communication system 100, such as spectral efficiency or user throughput of a transmission made by the mobile station 140. Such estimation of the user throughput may be based on equations for different MRTD schemes or the number of mobile stations 140 which have been allocated a certain radio access resource.

According to some embodiments, the allocation of the at least one radio access resource to the mobile station 140 may be repeated, continuously, or at a predetermined time interval.

In some additional embodiments, wherein the mobile station 140 is allocated a plurality of radio access resources, it may also be determined how the mobile station 140 is to combine the utilisation of this allocated plurality of radio access resources for communication within the wireless communication system 100. Such combination may be determined based on the received parameter values. Thus utilisation mode of the allocated plurality of radio access resources may be determined based on the received parameter values. Further, the mobile station 140 may be instructed to utilise the allocated radio access resource by MRTD according to the utilisation mode. Such utilisation mode may comprise how to utilise the allocated radio access resource by MRTD. Some examples may comprise e.g. switched-MRTD, where only one radio access resource may be used by the mobile station 140 at any time, parallel-MRTD, where multiple radio access resources may be used simultaneously and/or no-MRTD, where only one specific radio access resource may be used at all times.

Also, in some additional embodiments, wherein the mobile station 140 is allocated a plurality of radio access resources, the allocated radio access resources may be divided into a number of mutually exclusive sets, each comprising a plurality of radio access resources. Thus different combinations of MRTD, user scheduling and radio access resource allocation may be determined.

Further, measurement and signalling overhead of the mobile station 140 may be computed and/or determined. It may thereby be determined how often the mobile station 140 may measure over different radio access resources and report the made measurements to the network node 110, 120, 130.

According to some embodiments, the allocation of the at least one radio access resource to the mobile station 140 may be further based on e.g. a combination of MRTD, user scheduling and radio access resource allocation for throughput performance, energy performance or a combination of throughput performance and energy performance.

However, in some embodiments the allocation of the at least one radio access resource to the mobile station 140 may be further based on e.g. a combination of MRTD and maximum radio access resource rate allocation, or alternatively based on a combination of MRTD and minimum radio access resource energy consumption allocation.

Further, a list of candidate mobile stations for subsets of radio resources may be determined in some embodiments, based upon the at least one first, second and third parameter values of the mobile station 140, and an estimate of the total network performance.

Also, the transmission performance parameters for the corresponding subset of the radio access resources that the mobile station 140 may measure and report may be determined.

Action 503

The mobile station 140 is informed of the at least one allocated radio access resource.

In some embodiments, a radio resource utilisation message may be transmitted, indicating the at least one radio access resource allocated to the mobile station 140, to be received by the mobile station 140.

In some embodiments, where the allocation of the at least one radio access resource to the mobile station 140 is performed repeatedly, either continuously, or at a predetermined time interval, also the radio resource utilisation message may be transmitted repeatedly when the radio access resource allocation is updated.

Also, furthermore, in embodiments wherein the mobile station 140 is allocated a plurality of radio access resources, the radio resource utilisation message may in addition comprise an instruction for the mobile station 140, how to utilise the allocated radio access resource by MRTD. Some examples may comprise e.g. switched-MRTD, where only one radio access resource may be used by the mobile station 140 at any time, parallel-MRTD, where multiple radio access resources may be used simultaneously and/or no-MRTD, where only one specific radio access resource may be used at all times.

In some embodiments, the radio resource utilisation message transmitted to the mobile station 140 may comprise an instruction, instructing the mobile station 140 how to utilise the allocated radio access resources by redundant transmission. In some alternative embodiments, such instruction may instruct the mobile station 140 which radio access resource to use for data transmission and which radio access resource to use for signalling.

Also, according to some additional embodiments, the radio resource utilisation message transmitted to the mobile station 140 may comprise an instruction to the mobile station 140 concerning how often the mobile station 140 may measure and report over different radio access resources.

Also, according to some embodiments, the mobile station 140 may be instructed to measure and report transmission performance parameters for a subset of radio access resources.

Figure 6:
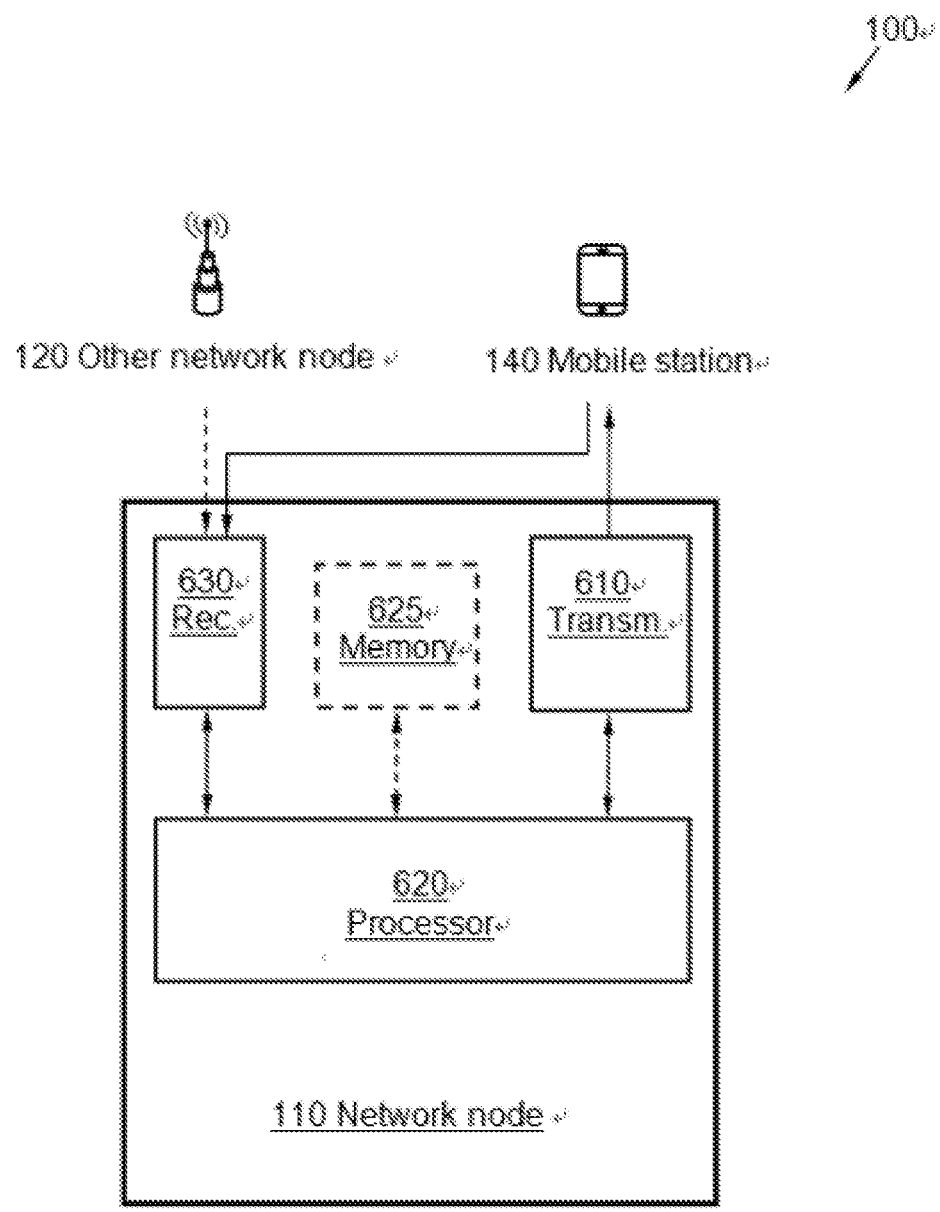
FIG. 6 is a block diagram illustrating a network node according to an embodiment.

FIG. 6 illustrates an embodiment of a network node 110, 120, 130 for radio access resource allocation of a mobile station 140 within a wireless communication system 100. The wireless communication system 100 comprises the network node 110, 120, 130 and the mobile station 140.

The illustrated network node 110, 120, 130 is further configured for performing the method 500 according to at least some of the previously described actions 501-503 for radio access resource allocation in order to save energy.

The mobile station 140 may be served by the network node 110, 120, 130 in the wireless communication system 100, comprising the network node 110, 120, 130 and possibly other network nodes 110, 120, 130.

The wireless communication network 100 may be based on e.g. 3GPP LTE. Further, the wireless communication system 100 may be based on FDD or TDD in different embodiments. The network node 110, 120, 130 may comprise e.g. an evolved NodeB (eNodeB) according to some embodiments. The allocated radio access resources may belong to different radio access technologies. Alternatively, the allocated radio access resources may belong to the same radio access technology according to some alternative embodiments.

For enhanced clarity, any internal electronics or other components of the network node 110, 120, 130, not completely indispensable for understanding the herein described embodiments have been omitted from FIG. 6.

The network node 110, 120, 130 comprises a receiver 630, configured to receive at least one first parameter value associated with a radio communication condition of the mobile station 140, at least one second parameter value associated with communication capabilities of the mobile station 140, and at least one third parameter value indicating operability in MRTD of the mobile station 140.

Thus the receiver may be configured for receiving signals from various mobile stations in the cell, besides the mobile station 140 and/or other radio transmitting devices over a wireless interface.

The at least one first parameter value associated with radio communication conditions of the mobile station 140 may comprise e.g. radio access conditions, radio access quality, channel quality, received signal strength or similar as perceived by the mobile station 140.

Further, the at least one second parameter value associated with communication capabilities of the mobile station 140 may comprise e.g. energy efficiency of the mobile station 140, energy consumption rate of the mobile station 140, transmission delay, energy consumption rate per bit, remaining battery capacity of the mobile station 140, capability and/or quality-of-service demands of the mobile station 140.

Also, the at least one third parameter value indicating operability in multi-radio transmit diversity of the mobile station 140 may comprise e.g. a model indication of the mobile station 140.

The receiver 630 may in some embodiments be further configured to receive a request for radio access resources from the mobile station 140.

The network node 110, 120, 130 comprises a processor 620, configured to allocate at least one radio access resource to the mobile station 140, based on the received parameter values.

Such processor 620 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

The processor 620 may also be configured to allocate at least one radio access resource to the mobile station 140, further based on transmission performance parameters within the wireless communication system 100, such as e.g. spectral efficiency or user throughput of a transmission made by the mobile station 140. Further, the processor 620 may be configured to estimate user throughput based on equations for different MRTD schemes and/or the number of mobile stations 140 which have been allocated a certain radio access resource.

Furthermore, the processor 620 may be configured to allocate the at least one radio access resource to the mobile station 140 continuously, or at a predetermined time interval.

Also, the processor 620 may be further configured to determine how the mobile station 140 may combine the utilisation of the allocated plurality of radio access resources for communication within the wireless communication system 100. Thus the processor 620 may be further configured to determine a utilisation mode of the allocated plurality of radio access resources based on the received parameter values, and also configured to instruct the mobile station 140 to utilise the allocated radio access resource by MRTD according to the utilisation mode. Such utilisation mode may comprise e.g. switched-MRTD, where only one radio access resource may be used by the mobile station 140 at any time; parallel-MRTD, where multiple radio access resources may be used simultaneously; or no-MRTD, where only one specific radio access resource may be used at all times.

The processor 620 may in some embodiments be configured to divide the allocated radio access resources into a number of mutually exclusive sets each comprising a plurality of radio access resources, where different combinations of MRTD, user scheduling and radio access resource allocation may be determined.

Additionally, the processor 620 may be configured to instruct the mobile station 140 how to utilise the allocated radio access resources by redundant transmission. Further, the processor 620 may be configured to indicate which radio access resource to use for data transmission and which radio access resource to use for signalling in some embodiments.

The processor 620 may also be further configured to instruct the mobile station 140 how to utilise the allocated radio access resources by redundant transmission, or configured to indicate a radio access resource to use for data transmission and a radio access resource to use for signalling. Further, the processor 620 may also be configured to compute measurement and report frequency of the mobile station 140.

The processor 620 may also be configured to compute and instruct measurement and signalling overhead of the mobile station 140, to the mobile station 140, such as e.g. how often the mobile station 140 is to measure and report over different radio access resources.

In some embodiments, the processor 620 may also be configured to determine which at least one radio access resource to allocate to the mobile station 140, further based on e.g. a combination of MRTD, user scheduling and radio access resource allocation for throughput performance, energy performance or a combination of throughput performance and energy performance.

In addition, the processor 620 may be configured to determine which at least one radio access resource to allocate to the mobile station 140, based on a combination of MRTD and maximum radio access resource rate allocation. Alternatively the processor 620 may be configured to determine which at least one radio access resource to allocate to the mobile station 140, based on a combination of MRTD and minimum radio access resource energy consumption allocation in some embodiments.

The processor 620 may also be configured to determine a list of candidate mobile stations for subsets of radio resources, based upon the at least one first, second and third parameter values associated with the mobile station 140 and an estimate of the total network performance in some embodiments. Further, the processor 620 may be configured to determine which transmission performance parameters the mobile station 140 is to measure and also instruct the mobile stations 140 to report transmission performance parameters for the corresponding subset of the radio access resources.

Further, the network node 110, 120, 130 comprises a transmitter 610, configured to inform the mobile station 140 of the at least one allocated radio access resource.

In some embodiments, the transmitter 610 may be configured to transmit a radio resource utilisation message, indicating the at least one radio access resource allocated to the mobile station 140, to be received by the mobile station 140.

Such radio resource utilisation message transmitted to the mobile station 140 may comprise various instructions concerning measurement, signalling and reporting, and also frequency and/or time period for such measurement, signalling and reporting.

Furthermore, the network node 110, 120, 130 may further comprise at least one memory 625, according to some embodiments. The optional memory 625 may comprise a physical device utilised to store data or programs, i.e., sequences of instructions, on a temporary or permanent basis. According to some embodiments, the memory 625 may comprise integrated circuits comprising silicon-based transistors. Further, the memory 625 may be volatile or non-volatile.

The above described actions 501-503 to be performed in the network node 110, 120, 130 may be implemented through the one or more processors 620 in the network node 110, 120, 130 together with computer program product for performing at least some of the functions of the actions 501-503. Thus a computer program comprising program code may perform the method 500 according to any, at least some, or all of the functions of the actions 501-503 for radio access resource allocation of the mobile station 140, when the computer program is loaded into the processor 620 of the network node 110, 120, 130.

Further, a computer program product may comprise a computer readable storage medium storing program code thereon for use by the network node 110, 120, 130, for saving energy at the mobile station 140. Such program code may comprise instructions for executing the method 500 comprising: receiving 501 at least one first parameter value associated with a radio communication condition of the mobile station 140, at least one second parameter value associated with communication capabilities of the mobile station 140, and at least one third parameter value indicating operability in multi-radio transmit diversity of the mobile station 140; determining 502 to allocate at least one radio access resource to the mobile station 140, based on the received 501 parameter values; and transmitting 503 a radio resource utilisation message indicating the at least one radio access resource allocated to the mobile station 140.

The computer program product mentioned above may be provided for instance in the form of a data carrier carrying computer program code for performing at least some of the actions 501-503 according to some embodiments when being loaded into the processor 620. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the mobile station 140 remotely, e.g., over an Internet or an intranet connection.

The terminology used in the description of the embodiments as illustrated in the accompanying drawings is not intended to be limiting of the described method 500; network node 110, 120, 130 and/or mobile station 140. Various changes, substitutions and/or alterations may be made, without departing from the embodiments of invention as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. The term "or" as used herein, is to be interpreted as a mathematical OR, i.e. as an inclusive disjunction; not as a mathematical Exclusive OR (XOR), unless expressly stated otherwise. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A network node for radio access resource allocation of a mobile station within a wireless communication system, comprising the network node and the mobile station, the network node comprising:
- a processor; and
- a non-transitory computer readable medium storing instructions, that when executed by the processor cause the following steps to be performed:
- receiving at least one first parameter value associated with a radio communication condition of the mobile station, at least one second parameter value associated with communication capabilities of the mobile station, and at least one third parameter indicating one of a parallel Multi Radio Transmit Diversity (MRTD), a switched MRTD and no MRTD, wherein the parallel MRTD indicates that the mobile station utilizes a plurality of radio accesses for data transmission in a transmission time interval (TTI) of a plurality of TTIs, the switched MRTD indicates that the mobile station utilizes only one radio access for the data transmission in a TTI of the plurality of TTIs, and no MRTD indicates that the mobile station utilizes only one radio access for the data transmission for all TTIs of the plurality of TTIs;
- allocating at least one radio access resource to the mobile station, based on the received parameter values; and
- informing the mobile station of the at least one allocated radio access resource.

2. The network node according to claim 1, wherein the at least one first parameter value associated with radio communication conditions of the mobile station comprises radio access conditions, radio access quality, channel quality, received signal strength.

3. The network node according to claim 1, wherein the at least one second parameter value associated with communication capabilities of the mobile station comprises at least one of energy efficiency of the mobile station, energy consumption rate of the mobile station, transmission delay, energy consumption rate per bit, remaining battery capacity of the mobile station, capability and quality-of-service demands of the mobile station.

4. The network node according to claim 1, wherein the at least one third parameter indicating operability in MRTD of the mobile station comprises a model indication of the mobile station.

5. The network node according to claim 1, wherein the steps further comprise allocating the at least one radio access resource to the mobile station based on transmission performance parameters within the wireless communication system.

6. The network node according to claim 1, wherein the steps further comprise allocating the at least one radio access resource to the mobile station continuously, or at a predetermined time interval.

7. The network node according to claim 1, wherein the steps further comprise determining a utilisation mode of the allocated radio access resources based on the received parameter values; and instructing the mobile station to utilise the allocated radio access resource by MRTD according to the utilisation mode.

8. The network node according to claim 1, wherein the steps further comprise dividing the allocated radio access resources into a plurality of mutually exclusive sets each set comprising a plurality of radio access resources; and determining a combination of MRTD, user scheduling and radio access resource allocation.

9. The network node according to claim 1, wherein the steps further comprise instructing the mobile station utilisation of the allocated radio access resources by redundant transmission.

10. The network node according to claim 1, wherein the steps further comprise at least one of computing measurement and report frequency of the mobile station; and indicating a radio access resource to use for data transmission and a radio access resource to use for signalling.

11. The network node according to claim 1, wherein the steps further comprise allocating at least one radio access resource to the mobile station, based on at least one of MRTD, user scheduling, throughput performance and energy performance.

12. The network node according to claim 1, wherein the steps further comprise allocating at least one radio access resource to the mobile station when the mobile station is operable in MRTD, based on a combination of MRTD and maximum radio access resource rate allocation; or based on a combination of MRTD and minimum radio access resource energy consumption allocation.

13. The network node according to claim 1, wherein the steps further comprise determining a list of candidate mobile stations to be allocated radio access resources, based upon the at least one first, second and third parameter values associated with the mobile station and an estimate of the total network performance; and determining which transmission performance parameters the mobile station is to measure and report.

14. A method in a network node for radio access resource allocation of a mobile station within a wireless communication system, comprising the network node and the mobile station, the method comprising:
- receiving at least one first parameter value associated with a radio communication condition of the mobile station, at least one second parameter value associated with communication capabilities of the mobile station, and at least one third parameter value indicating in which one of a parallel Multi Radio Transmit Diversity (MRTD), a switched MRTD and no MRTD, wherein the parallel MRTD indicates that the mobile station utilizes a plurality of radio accesses for data transmission in a transmission time interval (TTI) of a plurality of TTIs, the switched MRTD indicates that the mobile station utilizes only one radio access for the data transmission in a TTI of the plurality of TTIs, and no MRTD indicates that the mobile station utilizes only one radio access for the data transmission for all TTIs of the plurality of TTIs;
- allocating at least one radio access resource to the mobile station, based on the received parameter values;
- informing the mobile station of the at least one allocated radio access resource.

15. A non-transitory computer-readable medium storing computer executable instruction that when executed by a processor instruct the processor to:
- receive at least one first parameter value associated with a radio communication condition of a mobile station, at least one second parameter value associated with communication capabilities of the mobile station, and at least one third parameter value indicating one of a parallel Multi Radio Transmit Diversity (MRTD), a switched MRTD and no MRTD, wherein the parallel MRTD indicates that the mobile station utilizes a plurality of radio accesses for data transmission in a transmission time interval (TTI) of a plurality of TTIs, the switched MRTD indicates that the mobile station utilizes only one radio access for the data transmission in a TTI of the plurality of TTIs, and no MRTD indicates that the mobile station utilizes only one radio access for the data transmission for all TTIs of the plurality of TTIs;

allocate at least one radio access resource to the mobile station, based on the received parameter values;

inform the mobile station of the at least one allocated radio access resource.

* * * * *